United States Patent
Smith et al.

(10) Patent No.: US 7,856,012 B2
(45) Date of Patent: Dec. 21, 2010

(54) SYSTEM AND METHODS FOR GENERIC DATA TRANSPARENT RULES TO SUPPORT QUALITY OF SERVICE

(75) Inventors: Donald L. Smith, Satellite Beach, FL (US); Anthony P. Galluscio, Indialantic, FL (US); Robert J. Knazik, Cocoa Beach, FL (US)

(73) Assignee: Harris Corporation, Melbourne, FL (US)

( * ) Notice: Subject to any disclaimer, the term of this patent is extended or adjusted under 35 U.S.C. 154(b) by 914 days.

(21) Appl. No.: 11/454,662

(22) Filed: Jun. 16, 2006

(65) Prior Publication Data

US 2007/0291780 A1    Dec. 20, 2007

(51) Int. Cl.
*H04L 12/56* (2006.01)
(52) U.S. Cl. ...................... 370/389; 370/392
(58) Field of Classification Search ........... 370/395.21, 370/229, 230, 230.1, 231, 235, 389, 392, 370/400, 401; 709/207, 231
See application file for complete search history.

(56) References Cited

U.S. PATENT DOCUMENTS

| | | | |
|---|---|---|---|
| 5,559,999 | A | 9/1996 | Maturi et al. |
| 5,560,038 | A | 9/1996 | Haddock |
| 5,627,970 | A | 5/1997 | Keshav |
| 5,664,091 | A | 9/1997 | Keen |
| 5,671,224 | A | 9/1997 | Pyhalammi et al. |
| 5,844,600 | A | 12/1998 | Kerr |
| 5,949,758 | A | 9/1999 | Kober |
| 5,960,035 | A | 9/1999 | Sridhar et al. |
| 6,028,843 | A | 2/2000 | Delp et al. |
| 6,044,419 | A | 3/2000 | Hayek et al. |
| 6,067,557 | A | 5/2000 | Hegde |
| 6,072,781 | A | 6/2000 | Feeney et al. |
| 6,075,770 | A * | 6/2000 | Chang et al. .......... 370/395.21 |
| 6,124,806 | A | 9/2000 | Cunningham et al. |

(Continued)

FOREIGN PATENT DOCUMENTS

EP    0853404    7/1998

(Continued)

OTHER PUBLICATIONS

Bakre A. V. et al: "Implementation and Performance Evaluation of Indirect TCP" IEEE Transactions on Computers, vol. 46, No. 3, Mar. 1997.

(Continued)

*Primary Examiner*—Pankaj Kumar
*Assistant Examiner*—Duc T Duong
(74) *Attorney, Agent, or Firm*—McAndrews, Held & Malloy, Ltd.

(57) ABSTRACT

Embodiments of the present invention provide systems and methods for facilitating communication of data. A method for prioritizing a block of data to provide content-based quality of service in a network includes receiving a block of data, selecting a selected rule from a set of available rules, processing the block of data, and prioritizing the block of data. The selected rule includes an operation and a key. The block of data is processed according to the selected rule based at least in part on the operation to determine a decision value based at least in part on the key. The block of data is prioritized based at least in part on the decision value.

20 Claims, 6 Drawing Sheets

U.S. PATENT DOCUMENTS

| | | | |
|---|---|---|---|
| 6,154,778 | A | 11/2000 | Koistinen et al. |
| 6,170,075 | B1 | 1/2001 | Schuster et al. |
| 6,205,486 | B1 | 3/2001 | Wei et al. |
| 6,233,248 | B1 | 5/2001 | Sautter et al. |
| 6,236,656 | B1 | 5/2001 | Westerberg et al. |
| 6,247,058 | B1 | 6/2001 | Miller et al. |
| 6,279,035 | B1 | 8/2001 | Brown et al. |
| 6,301,527 | B1 | 10/2001 | Butland et al. |
| 6,314,425 | B1 | 11/2001 | Serbinis et al. |
| 6,332,163 | B1 | 12/2001 | Bowman-Amuah |
| 6,343,085 | B1 | 1/2002 | Krishnan et al. |
| 6,343,318 | B1 | 1/2002 | Hawkins et al. |
| 6,363,411 | B1 | 3/2002 | Dugan et al. |
| 6,397,259 | B1 | 5/2002 | Lincke et al. |
| 6,401,117 | B1 | 6/2002 | Narad et al. |
| 6,404,776 | B1 | 6/2002 | Voois et al. |
| 6,407,998 | B1 | 6/2002 | Polit et al. |
| 6,408,341 | B1 | 6/2002 | Feeney et al. |
| 6,421,335 | B1 | 7/2002 | Kilkki et al. |
| 6,438,603 | B1 | 8/2002 | Ogus |
| 6,490,249 | B1 | 12/2002 | Aboul-Magd et al. |
| 6,498,782 | B1 | 12/2002 | Branstad et al. |
| 6,507,864 | B1 | 1/2003 | Klein et al. |
| 6,532,465 | B2 | 3/2003 | Hartley et al. |
| 6,542,593 | B1 * | 4/2003 | Bowman-Amuah .... 379/201.03 |
| 6,556,982 | B1 | 4/2003 | McGaffey et al. |
| 6,557,053 | B1 | 4/2003 | Bass et al. |
| 6,560,592 | B1 | 5/2003 | Reid et al. |
| 6,563,517 | B1 | 5/2003 | Bhagwat et al. |
| 6,587,435 | B1 | 7/2003 | Miyake et al. |
| 6,587,875 | B1 | 7/2003 | Ogus |
| 6,590,588 | B2 | 7/2003 | Lincke et al. |
| 6,598,034 | B1 * | 7/2003 | Kloth .......................... 706/47 |
| 6,600,744 | B1 * | 7/2003 | Carr et al. ................... 370/392 |
| 6,611,522 | B1 * | 8/2003 | Zheng et al. ........... 370/395.21 |
| 6,614,781 | B1 | 9/2003 | Elliott et al. |
| 6,618,385 | B1 | 9/2003 | Cousins |
| 6,625,650 | B2 | 9/2003 | Stelliga |
| 6,633,835 | B1 | 10/2003 | Moran et al. |
| 6,640,184 | B1 | 10/2003 | Rabe |
| 6,640,248 | B1 | 10/2003 | Jorgensen |
| 6,650,902 | B1 | 11/2003 | Richton |
| 6,668,175 | B1 | 12/2003 | Almgren et al. |
| 6,671,589 | B2 | 12/2003 | Holst et al. |
| 6,671,732 | B1 | 12/2003 | Weiner |
| 6,680,922 | B1 | 1/2004 | Jorgensen |
| 6,687,735 | B1 | 2/2004 | Logston et al. |
| 6,691,168 | B1 | 2/2004 | Bal et al. |
| 6,700,871 | B1 | 3/2004 | Harper et al. |
| 6,715,145 | B1 | 3/2004 | Bowman-Amuah |
| 6,728,749 | B1 | 4/2004 | Richardson |
| 6,732,228 | B1 * | 5/2004 | Willardson .................. 711/108 |
| 6,741,562 | B1 | 5/2004 | Keirouz et al. |
| 6,748,070 | B2 | 6/2004 | Kalmanek, Jr. et al. |
| 6,760,309 | B1 | 7/2004 | Rochberger et al. |
| 6,771,609 | B1 | 8/2004 | Gudat et al. |
| 6,772,223 | B1 * | 8/2004 | Corl et al. ................... 709/238 |
| 6,778,530 | B1 * | 8/2004 | Greene ....................... 370/389 |
| 6,778,546 | B1 | 8/2004 | Epps et al. |
| 6,798,776 | B1 | 9/2004 | Cheriton et al. |
| 6,819,655 | B1 | 11/2004 | Gregson |
| 6,819,681 | B1 | 11/2004 | Hariharasubrahmanian |
| 6,820,117 | B1 | 11/2004 | Johnson |
| 6,822,940 | B1 * | 11/2004 | Zavalkovsky et al. ....... 370/237 |
| 6,826,627 | B2 | 11/2004 | Sjollema et al. |
| 6,832,118 | B1 | 12/2004 | Heberlein et al. |
| 6,832,239 | B1 | 12/2004 | Kraft et al. |
| 6,839,731 | B2 | 1/2005 | Alexander et al. |
| 6,839,768 | B2 | 1/2005 | Ma et al. |
| 6,845,100 | B1 | 1/2005 | Rinne |
| 6,850,486 | B2 | 2/2005 | Saleh et al. |
| 6,854,009 | B1 | 2/2005 | Hughes |
| 6,854,069 | B2 | 2/2005 | Kampe et al. |
| 6,862,265 | B1 | 3/2005 | Appala et al. |
| 6,862,622 | B2 | 3/2005 | Jorgensen |
| 6,865,153 | B1 | 3/2005 | Hiel et al. |
| 6,870,812 | B1 | 3/2005 | Kloth et al. |
| 6,873,600 | B1 | 3/2005 | Duffield et al. |
| 6,879,590 | B2 | 4/2005 | Pedersen et al. |
| 6,882,642 | B1 | 4/2005 | Kejriwal et al. |
| 6,885,643 | B1 | 4/2005 | Teramoto et al. |
| 6,888,806 | B1 | 5/2005 | Miller et al. |
| 6,888,807 | B2 | 5/2005 | Heller et al. |
| 6,891,839 | B2 | 5/2005 | Albert et al. |
| 6,891,842 | B2 | 5/2005 | Sahaya et al. |
| 6,891,854 | B2 | 5/2005 | Zhang et al. |
| 6,892,309 | B2 * | 5/2005 | Richmond et al. ............. 726/7 |
| 6,901,484 | B2 | 5/2005 | Doyle et al. |
| 6,904,054 | B1 | 6/2005 | Baum et al. |
| 6,904,058 | B2 | 6/2005 | He et al. |
| 6,907,243 | B1 | 6/2005 | Patel |
| 6,907,462 | B1 | 6/2005 | Li et al. |
| 6,910,074 | B1 | 6/2005 | Amin et al. |
| 6,912,221 | B1 | 6/2005 | Zadikian et al. |
| 6,914,882 | B2 | 7/2005 | Merani et al. |
| 6,917,622 | B2 | 7/2005 | McKinnon, III et al. |
| 6,920,145 | B2 | 7/2005 | Matsuoka et al. |
| 6,922,724 | B1 | 7/2005 | Freeman et al. |
| 6,928,085 | B2 | 8/2005 | Pabari et al. |
| 6,928,471 | B2 | 8/2005 | Pabari et al. |
| 6,934,250 | B1 | 8/2005 | Kejriwal et al. |
| 6,934,752 | B1 | 8/2005 | Gubbi |
| 6,934,795 | B2 * | 8/2005 | Nataraj et al. ............... 711/108 |
| 6,937,154 | B2 | 8/2005 | Zeps et al. |
| 6,937,561 | B2 | 8/2005 | Chiussi et al. |
| 6,937,566 | B1 | 8/2005 | Forslow |
| 6,937,591 | B2 | 8/2005 | Guo et al. |
| 6,940,808 | B1 | 9/2005 | Shields et al. |
| 6,940,813 | B2 | 9/2005 | Ruutu et al. |
| 6,940,832 | B2 | 9/2005 | Saadawi et al. |
| 6,941,341 | B2 | 9/2005 | Logston et al. |
| 6,944,168 | B2 | 9/2005 | Paatela et al. |
| 6,947,378 | B2 | 9/2005 | Wu et al. |
| 6,947,943 | B2 | 9/2005 | DeAnna et al. |
| 6,947,996 | B2 | 9/2005 | Assa et al. |
| 6,950,400 | B1 | 9/2005 | Tran et al. |
| 6,950,441 | B1 | 9/2005 | Kaczmarczyk et al. |
| 6,952,401 | B1 | 10/2005 | Kadambi et al. |
| 6,952,416 | B1 | 10/2005 | Christie, IV |
| 6,975,647 | B2 | 12/2005 | Neale et al. |
| 7,023,851 | B2 * | 4/2006 | Chakravorty ................ 370/392 |
| 7,095,715 | B2 | 8/2006 | Buckman et al. |
| 7,103,008 | B2 * | 9/2006 | Greenblat et al. ........... 370/258 |
| 7,149,898 | B2 | 12/2006 | Marejka et al. |
| 7,200,144 | B2 | 4/2007 | Terrell et al. |
| 7,251,242 | B2 | 7/2007 | Schrodi |
| 7,260,102 | B2 | 8/2007 | Mehrvar et al. |
| 7,266,085 | B2 * | 9/2007 | Stine ........................... 370/252 |
| 7,289,498 | B2 * | 10/2007 | Yu et al. ..................... 370/389 |
| 7,330,908 | B2 | 2/2008 | Jungck |
| 7,337,236 | B2 | 2/2008 | Bess et al. |
| 7,349,422 | B2 | 3/2008 | Duong et al. |
| 7,359,321 | B1 | 4/2008 | Sindhu et al. |
| 7,376,829 | B2 | 5/2008 | Ranjan |
| 7,408,932 | B2 * | 8/2008 | Kounavis et al. ............ 370/392 |
| 7,424,579 | B2 | 9/2008 | Wheeler et al. |
| 7,433,307 | B2 | 10/2008 | Hooper et al. |
| 7,434,221 | B2 | 10/2008 | Hooper et al. |
| 7,471,689 | B1 | 12/2008 | Tripathi et al. |
| 7,477,651 | B2 | 1/2009 | Schmidt et al. |
| 7,489,666 | B2 | 2/2009 | Koo et al. |
| 7,499,457 | B1 | 3/2009 | Droux et al. |
| 7,543,072 | B1 | 6/2009 | Hertzog et al. |
| 7,590,756 | B2 | 9/2009 | Chan |

| | | |
|---|---|---|
| 2001/0030970 A1 | 10/2001 | Wiryaman et al. |
| 2002/0009060 A1 | 1/2002 | Gross |
| 2002/0009081 A1 | 1/2002 | Sampath et al. |
| 2002/0010792 A1 | 1/2002 | Border |
| 2002/0062395 A1 | 5/2002 | Thompson et al. |
| 2002/0091802 A1 | 7/2002 | Paul et al. |
| 2002/0099854 A1* | 7/2002 | Jorgensen .................... 709/249 |
| 2002/0122387 A1 | 9/2002 | Ni |
| 2002/0122395 A1 | 9/2002 | Bourlas et al. |
| 2002/0141338 A1 | 10/2002 | Burke |
| 2002/0143948 A1 | 10/2002 | Maher |
| 2002/0160805 A1 | 10/2002 | Laitinen et al. |
| 2002/0188871 A1 | 12/2002 | Noehring et al. |
| 2002/0191253 A1 | 12/2002 | Yang et al. |
| 2003/0004952 A1 | 1/2003 | Nixon et al. |
| 2003/0016625 A1 | 1/2003 | Narsinh et al. |
| 2003/0021291 A1 | 1/2003 | White et al. |
| 2003/0033394 A1 | 2/2003 | Stine |
| 2003/0067877 A1 | 4/2003 | Sivakumar |
| 2003/0097481 A1* | 5/2003 | Richter ....................... 709/251 |
| 2003/0110286 A1 | 6/2003 | Antal et al. |
| 2003/0112802 A1 | 6/2003 | Ono et al. |
| 2003/0118107 A1 | 6/2003 | Itakura et al. |
| 2003/0125040 A1* | 7/2003 | Walton et al. ............... 455/454 |
| 2003/0158963 A1 | 8/2003 | Sturdy et al. |
| 2003/0189935 A1 | 10/2003 | Warden et al. |
| 2003/0189940 A1* | 10/2003 | Greenblat ................... 370/406 |
| 2003/0195983 A1 | 10/2003 | Krause |
| 2003/0236828 A1 | 12/2003 | Rock et al. |
| 2004/0001493 A1 | 1/2004 | Cloonan et al. |
| 2004/0038685 A1 | 2/2004 | Nakabayashi |
| 2004/0057437 A1 | 3/2004 | Daniel et al. |
| 2004/0076161 A1* | 4/2004 | Lavian et al. .......... 370/395.41 |
| 2004/0077345 A1 | 4/2004 | Turner et al. |
| 2004/0125815 A1 | 7/2004 | Shimazu et al. |
| 2004/0131014 A1 | 7/2004 | Thompson et al. |
| 2004/0165528 A1 | 8/2004 | Li et al. |
| 2004/0172476 A1 | 9/2004 | Chapweske |
| 2004/0174898 A1 | 9/2004 | Kadambi et al. |
| 2004/0190451 A1 | 9/2004 | Dacosta |
| 2004/0218532 A1 | 11/2004 | Khirman |
| 2004/0228363 A1* | 11/2004 | Adamczyk et al. .......... 370/468 |
| 2004/0252698 A1* | 12/2004 | Anschutz et al. ....... 370/395.21 |
| 2005/0021806 A1 | 1/2005 | Richardson et al. |
| 2005/0030952 A1 | 2/2005 | Elmasry |
| 2005/0041669 A1* | 2/2005 | Cansever et al. ....... 370/395.21 |
| 2005/0060427 A1 | 3/2005 | Phillips et al. |
| 2005/0078672 A1 | 4/2005 | Caliskan et al. |
| 2005/0157660 A1* | 7/2005 | Mandato et al. ............. 370/254 |
| 2005/0169257 A1 | 8/2005 | Lahetkangas et al. |
| 2005/0171932 A1 | 8/2005 | Nandhra |
| 2005/0220115 A1 | 10/2005 | Romano et al. |
| 2005/0226233 A1 | 10/2005 | Kryuchkov et al. |
| 2005/0232153 A1 | 10/2005 | Bishop et al. |
| 2005/0281277 A1 | 12/2005 | Killian |
| 2006/0036906 A1 | 2/2006 | Luciani et al. |
| 2006/0039381 A1* | 2/2006 | Anschutz et al. ....... 370/395.21 |
| 2006/0039404 A1 | 2/2006 | Rao et al. |
| 2006/0104287 A1 | 5/2006 | Rogasch et al. |
| 2006/0106753 A1 | 5/2006 | Yoon et al. |
| 2006/0109857 A1 | 5/2006 | Herrmann |
| 2006/0140121 A1 | 6/2006 | Kakani et al. |
| 2006/0149845 A1 | 7/2006 | Malin et al. |
| 2006/0165051 A1 | 7/2006 | Banerjee et al. |
| 2006/0215593 A1 | 9/2006 | Wang et al. |
| 2006/0286993 A1 | 12/2006 | Xie et al. |
| 2007/0058561 A1 | 3/2007 | Virgile |
| 2007/0060045 A1 | 3/2007 | Prautzsch |
| 2007/0133582 A1 | 6/2007 | Banerjee et al. |
| 2007/0153798 A1 | 7/2007 | Krstulich |
| 2007/0156919 A1 | 7/2007 | Potti et al. |
| 2007/0171910 A1 | 7/2007 | Kumar |
| 2007/0189327 A1 | 8/2007 | Konda |
| 2007/0206506 A1 | 9/2007 | Purpura |
| 2007/0253412 A1 | 11/2007 | Batteram et al. |
| 2007/0263616 A1 | 11/2007 | Castro et al. |
| 2007/0275728 A1 | 11/2007 | Lohr et al. |
| 2007/0291656 A1 | 12/2007 | Knazik et al. |
| 2007/0291751 A1 | 12/2007 | Smith et al. |
| 2007/0291766 A1 | 12/2007 | Knazik et al. |
| 2008/0065808 A1 | 3/2008 | Hoese et al. |
| 2008/0144493 A1 | 6/2008 | Yeh |
| 2008/0293413 A1 | 11/2008 | Sharif-Ahmadi et al. |
| 2009/0161741 A1 | 6/2009 | Ginis et al. |

FOREIGN PATENT DOCUMENTS

| | | |
|---|---|---|
| EP | 0886454 | 12/1998 |
| EP | 1052816 | 11/2000 |
| EP | 1052816 A2 | 11/2000 |
| EP | 1191751 | 3/2002 |
| EP | 1193938 | 3/2002 |
| EP | 1193938 | 4/2002 |
| EP | 1193938 A1 | 4/2002 |
| EP | 1300991 | 4/2003 |
| EP | 1300991 A1 | 4/2003 |
| EP | 1180882 | 10/2004 |
| EP | 1575224 | 2/2005 |
| EP | 1575224 | 9/2005 |
| EP | 1648125 | 4/2006 |
| JP | 2004-222010 | 5/2004 |
| WO | WO0174027 | 10/2001 |
| WO | 0230066 | 4/2002 |
| WO | WO0230066 A1 | 4/2002 |
| WO | WO03053013 | 6/2003 |
| WO | WO2004023323 | 3/2004 |
| WO | WO2004036845 | 4/2004 |
| WO | WO2005076539 | 8/2005 |
| WO | 2006001155 | 7/2006 |
| WO | WO2006071155 | 7/2006 |
| WO | WO2006071155 A1 | 7/2006 |
| WO | 2007149165 | 2/2007 |
| WO | 2007149166 | 2/2007 |
| WO | 2007130414 | 11/2007 |
| WO | 2007130415 | 11/2007 |
| WO | 2007147032 | 12/2007 |
| WO | 2007147040 | 12/2007 |
| WO | 2007149769 | 12/2007 |
| WO | 2007149805 | 12/2007 |
| WO | WO2007147032 A1 | 12/2007 |
| WO | WO2007147040 A2 | 12/2007 |
| WO | WO2007149769 A2 | 12/2007 |
| WO | WO2007149805 A2 | 12/2007 |
| WO | 2008008865 | 1/2008 |
| WO | WO2008008865 A2 | 1/2008 |
| WO | 2008016845 | 2/2008 |
| WO | 2008016846 | 2/2008 |
| WO | 2008016848 | 2/2008 |
| WO | 2008016850 | 2/2008 |
| WO | WO2008016845 A1 | 2/2008 |
| WO | WO2008016846 A2 | 2/2008 |
| WO | WO2008016848 A2 | 2/2008 |
| WO | WO2008016850 A2 | 2/2008 |

OTHER PUBLICATIONS

Chao, H-L, et al.: "Fair Scheduling with QoS Support in Wireless Ad Hoc Networks," IEEE Transactions on Wireless Communications, vol. 3, No. 6, Nov. 2004.

Information Sciences Institute, University of Southern California, "Internet Protocol DARPA Internet Program Protocol Specification," IETF Standard, Internet Engineering Task Force, IETF, CH, Sep. 1981.

Madubata, C.D.: "Prioritization of the Joint Battle Space Infosphere (JBI) Traffic and Priority with Reciprocity CAC Protocol for the JBI Network," System Theory, 2006 Proceeding of the Thirty-Eighth Southeastern Symposium on Mar. 5, 2006.

Orda, A. et al: "Routing with Packet Duplication and Elimination in Computer Networks," IEEE Transactions on Communications, vol. 36, No. 7, Jul. 1988.

Pancha, P., et al.: "A Delay-Minimizing Service Policy with Guaranteed Bandwidth for Real-Time Traffic," Internet Article, Aug. 23, 1995.

Perkins, Charles E., et al.: "Quality of Service for Ad hoc On-Demand Distance Vector Routing draft-perkins-manet-aodvqos-01.txt," IETF Standard-Working-Draft, Internet Engineering Task Force, IETF, Ch. No. 1, Oct. 14, 2003.

Robles, Tomas, et al.: "QoS Support for an All-IP System Beyond 3G," IEEE Communications Magazine, vol. 39, No. 8, Aug. 2001.

Schoenwaelder, J., "Overview of the 2002 IAB Network Management Workshop," IETF Standard, Internet Engineering Task Force, May 2003.

Xue, Jianbo, et al.: "ASAP: An Adaptive QoS Protocol for Mobile Ad Hoc Networks," Personal, Indoor and Mobile Radio Communications, 2003. PIMRC 203. 14th IEEE Proceedings on Sep. 7-10, 2003, vol. 2, Sep. 7, 2003.

International Search Report and Written Opinion, dated Dec. 12, 2007, for International application No. PCT/ US2007/071177, filed Jun. 14, 2007.

International Search Report and Written Opinion, dated Jan. 29, 2008, for International application No. PCT/ US2007/071191, filed Jun. 14, 2007.

International Search Report and Written Opinion, dated Jan. 17, 2008, for International application No. PCT/ US2007/071273, filed Jun. 14, 2007.

International Search Report and Written Opinion, dated Dec. 12, 2007, for International application No. PCT/ US2007/071440, filed Jun. 18, 2007.

International Search Report and Written Opinion, dated Jan. 2, 2008, for International application No. PCT/ US2007/073301, filed Jul. 12, 2007.

International Search Report and Written Opinion, dated Jan. 15, 2008, for International application No. PCT/ US2007/074577, filed Jul. 27, 2007.

International Search Report and Written Opinion, dated Jan. 24, 2008, for International application No. PCT/ US2007/074587, filed Jul. 27, 2007.

International Search Report and Written Opinion, dated Feb. 6, 2008, for International application No. PCT/ US2007/074592, filed Jul. 27, 2007.

International Search Report and Written Opinion, dated Jan. 22, 2008, for International application No. PCT/ US2007/074599, filed Jul. 27, 2007.

International Search Report and Written Opinion, dated Mar. 14, 2008, for International application No. PCT/ US2007/011649, filed May 15, 2007.

Office Action, dated Apr. 2, 2008, for U.S. Appl. No. 11/416,057, filed May 2, 2006.

Office Action, dated Apr. 4, 2008, for U.S. Appl. No. 11/415,914, filed May 5, 2006.

Pancha, P. et al.: "A Delay-Minimizing Service Policy with Guaranteed Bandwidth for Real-Time Traffic," Internet Article, Aug. 23, 1995.

Perkins, Charles E., et al.: "Quality of Service for Ad hoc On-Demand Distance Vector Routing draft-perkins-manet-aodvqos-01.txt," IETF Standard-Working-Draft, Internet Engineering Task Force, IETF, Ch. No. 1, Oct. 14, 2003.

Robles, Tomas et al.: "QoS Support for an All-IP System Beyond 3G," IEEE Communications Magazine, vol. 39, No. 8, Aug. 2001.

Schoenwaelder, J., "Overview of the 2002 IAB Network Management Workshop," IETF Standard, Internet Engineering Task Force, May 2003.

Tactical Data Network (TDN). USMC Concepts+Programs 2003. p. 140.

Xue, Jianbo, et al.: "ASAP: An Adaptive QoS Protocol for Mobile Ad Hoc Networks," Personal, Indoor and Mobile Radio Communications, 2003. PIMRC 203. 14th IEEE Proceedings on Sep. 7-10, 2003, vol. 2, Sep. 7, 2003.

Office Action dated Apr. 27, 2009 for U.S. Appl. No 11/416,043.

Bakre A. V. et al: "Implementation and Performance Evaluation of Indirect TCP" IEEE Transactions on Computers, vol. 46, No. 3, Mar. 1997.

"CCSDS File Delivery Protocol (CFDP)—Part 1—Introduction and Overview" (CCSDS 720.1-G-2—Green Book, Sep. 2003).

"CCSDS File Delivery Protocol (CFDP) Part 2—Implementers Guide" (CCSDS 720:2-G-2, Green Book, Sep. 2003).

Chao, H-L, et al.: "Fair Scheduling with QoS Support in Wireless Ad Hoc Networks," IEEE Transactions on Wireless Communications, vol. 3, No. 6, Nov. 2004.

Gao et al., "Performance Evaluation of the CCSDS File Delivery Protocol—Latency and Storage Requirement", Dec. 10, 2004.

Information Sciences Institute, University of Southern California, "Internet Protocol DARPA Internet Program Protocol Specification," IETF Standard, Internet Engineering Task Force, IETF, CH, Sep. 1981.

International Preliminary Report on Patentability dated Feb. 6, 2008 for International Application No. PCT/ US2007/071269 filed Jun. 14, 2007.

International Search Report and Written Opinion dated Apr. 28, 2008 for International Application No. PCT/ US07/11650 filed May 15, 2007.

International Search Report and Written Opinion dated Apr. 28, 2008 for International Application No. PCT/ US07/10559 filed May 1, 2007.

International Search Report and Written Opinion dated Apr. 29, 2008 for International Application No. PCT/ US07/10558 filed May 15, 2007.

International Search Report and Written Opinion dated Jun. 5, 2008 for International Application No. PCT/US07/11651 filed May 15, 2007.

International Search Report and Written Opinion, dated Dec. 12, 2007, for International Application No. PCT/ US2007/071177, Filed Jun. 14, 2007.

International Search Report and Written Opinion, dated Dec. 12, 2007, for International Application No. PCT/ US2007/071440, filed Jun. 18, 2007.

International Search Report and Written Opinion, dated Feb. 6, 2008, for International Application No. PCT/ US2007/074592, filed Jul. 27, 2007.

International Search Report and Written Opinion, dated Jan. 15, 2008 for International Application No. PCT/ US2007/074577, filed Jul. 27, 2007.

International Search Report and Written Opinion, dated Jan. 17, 2008, for International Application No. PCT/ US2007/071273, filed Jun. 14, 1997.

International Search Report and Written Opinion, dated Jan. 2, 2008, for International Application No. PCT/ US2007/073301, filed Jul. 12, 2007.

International Search Report and Written Opinion, dated Jan. 22, 2008, for International Application No. PCT/ US2007/074599, filed Jul. 27, 2007.

International Search Report and Written Opinion, dated Jan. 24, 2008, for International Application No. PCT/ US2007/074587, filed Jul. 27, 2007.

International Search Report and Written Opinion, dated Mar. 14, 2008, for International Application No. PCT/ US2007/011649 filed May 15, 2007.

International Search Report and Written Opinion, dated Jan. 29, 2008, for International Application No. PCT/ US2007/071191. filed Jun. 14, 1997.

International Search Report and Written Opinion, dated Jan. 2, 2008 for International Application No. PCT/ US2007/073301, filed Jul. 12, 2007.

Lee, Et Al., "Expected File-Delivery Time of Deferred NAK ARQ in CCSDS File-Delivery Protocol", Aug. 2004, IEEE Transactions on Communications, vol. 52 Issue 8. pp. 1408-1416.

Madubata, C.D.: "Prioritization of the Joint Battle Space Infosphere (JBI) Traffic and Priority with Reciprocity CAC Protocol for the JBI Network," System Theory, 2006 Proceeding of the Thirty-Eighth Southeastern Symposium on Mar. 5, 2006.

Office Action dated Apr. 23, 2008, for U.S. Appl. No. 11/416,043, filed May 2, 2006.

Office Action dated Oct. 20, 2008, for U.S. Appl. No. 11/416,043, filed May 2, 2006.
Office Action dated Dec. 22, 2008, for U.S. Appl. No. 11/425,021, filed Jun. 19, 2006.
Office Action dated Jan. 5, 2009, for U.S. Appl. No. 11/425,281, filed Jun. 20, 2006.
Office Action dated Jan. 30, 2009, for U.S. Appl. No. 11/425,289, filed Jun. 20, 2006.
Office Action dated Feb. 5, 2009, for U.S. Appl. No. 11/436,912, filed May 18, 2006.
Office Action dated May 21, 2008, for U.S. Appl. No. 11/436,912, filed May 18, 2009.
Office Action dated Oct. 16, 2008, for U.S. Appl. No. 11/436,912, filed May 18, 2006.
Office Action dated Apr. 1, 2009, for U.S. Appl. No. 11/454,206, filed Jun. 16, 2006.
Office Action dated May 30, 2008, for U.S. Appl. No. 11/454,206, filed Jun. 16, 2006.
Office Action dated Dec. 11, 2008, for U.S. Appl. No. 11/454,206, filed Jun. 16, 2006.
Office Action dated May 30, 2008, for U.S. Appl. No. 11/454,219, filed Jun. 16, 2006.
Office Action dated Dec. 15, 2008, for U.S. Appl. No. 11/454,219, filed Jun. 16, 2006.
Office Action dated Nov. 25, 2008, for U.S. Appl. No. 11/454,220, filed Jun. 16, 2006.
Office Action dated Dec. 4, 2008, for U.S. Appl. No. 11/454,662, filed Jun. 16, 2006.
Office Action dated Dec. 29, 2008, for U.S. Appl. No. 11/457,662, filed Jul. 14, 2006.
Office Action dated Nov. 13, 2008, for U.S. Appl. No. 11/461,082, filed Jul. 31, 2006.
Office Action dated Mar. 6, 2009, for U.S. Appl. No. 11/471,923, filed Jun. 21, 2006.
Office Action dated Oct. 17, 2008, for U.S. Appl. No. 11/416,057, filed May 2, 2006.
Office Action dated Feb. 9, 2009, for U.S. Appl. No. 11/416,057, filed May 2, 2006.
Office Action dated Apr. 2, 2008, for U.S. Appl. No. 11/416,057, filed May 2, 2006.
Office Action dated Apr. 2, 2009, for U.S. Appl. No. 11/415,914, filed May 5, 2006.
Office Action dated Oct. 20, 2008, for U.S. Appl. No. 11/415,914, filed May 5, 2006.
Office Action dated Apr. 2, 2008, for U.S. Appl. No. 11/415,914, filed May 5, 2006.
Office Action dated Apr. 21, 2009, for U.S. Appl. No. 11/454,220, filed Jun. 16, 2006.
Orda, A. et al.,: "Routing with Packet Duplication and Elimination in Computer Networks," IEEE Transactions on Communications, vol. 36, No. 7, Jul. 1988.
Office Action dated Apr. 20, 2010 for U.S. Appl. No. 11/425,281, filed Jun. 20, 2006.
Advisory Action dated Apr. 13, 2010 for U.S. Appl. No. 11/454,219, filed Jun. 16, 2006.
Notice of Panel Decision from Pre-Appeal Brief Review dated Jul. 7, 2010 for U.S. Appl. No. 11/454,219, filed Jun. 16, 2006.
Examiner's Answer to Appeal Brief dated Jul. 8, 2010 for U.S. Appl. No. 11/454,206, filed Jun. 16, 2006.
Notice of Panel Decision from Pre-Appeal Brief Review dated Mar. 26, 2010 for U.S. Appl. No. 11/454,206, filed Jun. 16, 2006.
Office Action dated May 20, 2010 for U.S. Appl. No. 11/454,517, filed Jun. 16, 2006.
Dong et al., "APV: A Highly Efficient Transport Protocol for Low Bit Rate Multimedia Connections," Multimedia Tools and Applications, pp. 187-216, 2005.
Communication Pursuant to Article 94(3) EPC, Application No. 07812151.4, dated Jan. 21, 2010.
Office Action dated May 6, 2010 for U.S. Appl. No. 11/425,021, filed Jun. 19, 2006.
Office Action dated Apr. 27, 2010 for U.S. Appl. No. 11/424,635, filed Jun. 16, 2006.

Advisory Action dated May 13, 2010 for U.S. Appl. No. 11/454,220, filed Jun. 16, 2006.
Information Sciences Institute, "Internet Protocol Darpa Internet Program Protocol Specification," pp. 1-46, Sep. 1981.
Communication Pursuant to Article 94(3) EPC, Application No. 07813469.9, dated Nov. 17, 2009.
Office Action dated Apr. 27, 2010 for U.S. Appl. No. 11/461,082, filed Jul. 31, 2006.
Office Action dated May 11, 2010 for U.S. Appl. No. 11/425,289, filed Jun. 20, 2006.
Communication Pursuant to Rule 62 EPC, Application No. 07777069.1, dated Mar. 16, 2010.
Notice of Panel Decision from Pre-Appeal Brief Review, dated Jun. 2, 2010 for U.S. Appl. No. 11/436,912,3 filed May 18, 2006.
Office Action dated Jun. 10, 2010 for U.S. Appl. No. 11/457,662, filed Jul. 14, 2006.
Consultative Committee for Space Data Systems, "CCSDS File Delivery Protocol (CFDP)—Part 2—Implementers Guide," CCSDS 720.2-G-2—Green Book, Sep. 2003.
Akimeka, "LLC— Mobile Modular Command Center (M2C2) Advanced Technologies Training Program (ATTP) Final Analysis Report," 2004.
Ali et al., "Solider Network Extension (SNE) On-The-Move Satellite Communications (SATCOM) for Army Tactical Battalion-Level Network Healing and Thickening," Oct. 2007.
Applecore, "What are APIs, why use them, how to use them, and how to find out more," pp. 1-3, May 2005.
Barker, "Overcoming the Data-Scale Management Challenge in Large Dynamic Networks," Military Communications Conference, MILCOM 2005, IEEE; pp. 1-7, Oct. 2005.
Laurie, "DLL Files in Windows—What Are They?," pp. 1-2, 2004.
Lee et al., "Expected File-Delivery Time of Deferred NAK ARQ in CCSDS File-Delivery Protocol," IEEE Transactions on Communications, vol. 52, Issue 8, pp. 1408-1416, Aug. 2004.
Zheng et al., "Group-Mobility-Aware Spectrum Management for Future Digital Battlefields," Military Communications Conference, 2006, MILCOM 2006, IEEE; pp. 1-7, Oct. 2006.
Floyd et al., "Link-sharing and Resource Management Models for Packet Networks," IEEE/ACM Transactions on Networking, vol. 3, No. 4, all pages, Aug. 1995.
Chan, "Precedence Based Admission Control and Preemption in IP Networks," Military Communications Conference, 2006, MILCOM 2006, IEEE, pp. 1-7, Oct. 2006.
Advisory Action dated Jan. 12, 2010, for U.S. Appl No. 11/454,206, filed Jun. 16, 2006.
Office Action dated Oct. 13, 2009 for U.S. Appl. No. 11/471,923, filed Jun. 21, 2006.
Office Action dated Jan. 5, 2009, for U.S. Appl. No. 11/425,281, filed Jun. 20, 2006.
Office Action dated Jun. 5, 2009, for U.S. Appl. No. 11/416,057, filed May 2, 2006.
Office Action dated Jun. 10, 2009, for U.S. Appl. No. 11/454,517, filed Jun. 16, 2006.
Office Action dated Jul. 1, 2009, for U.S. Appl. No. 11/425,281, filed Jun. 20, 2006.
Office Action dated Jul. 15, 2009, for U.S. Appl. No. 11/454,219, filed Jun. 16, 2006.
Office Action dated Oct. 5, 2009, for U.S. Appl. No. 11/496,107, filed Jul. 31, 2006.
Office Action dated Oct. 13, 2009, for U.S. Appl. No. 11/454,219, filed Jun. 16, 2006.
Office Action dated Oct. 15, 2009, for U.S. Appl. No. 11/425,281, filed Jun. 20, 2006.
Office Action dated Dec. 30, 2009, for U.S. Appl. No. 11/416,057, filed May 2, 2006.
Office Action dated May 27, 2009, for U.S. Appl. No. 11/454,662, filed Jun. 16, 2006.
Office Action dated Sep. 18, 2009 for U.S. Appl. No. 11/454,662, filed Jun. 16, 2006.
Office Action dated May 13, 2009 for U.S. Appl. No. 11/424,635, filed Jun. 16, 2006.
Office Action dated Dec. 10, 2009 for U.S. Appl. No. 11/424,635, filed Jun. 16, 2006.

Office Action dated Oct. 13, 2009 for U.S. Appl. No. 11/416,043, filed May 2, 2006.
Office Action dated Sep. 15, 2009 for U.S. Appl. No. 11/454,220, filed Jun. 16, 2006.
Office Action dated May 1, 2009 for U.S. Appl. No. 11/461,052, filed Jul. 31, 2006.
Office Action dated Dec. 15, 2009 for U.S. Appl. No. 11/461,052, filed Jul. 31, 2006.
Office Action dated Jun. 25, 2009 for U.S. Appl. No. 11/461,082, filed Jul. 31, 2006.
Office Action dated Oct. 28, 2009 for U.S. Appl. No. 11/461,082, filed Jul. 31, 2006.
Office Action dated Jun. 10, 2009 for U.S. Appl. No. 11/425,289, filed Jun. 20, 2006.
Office Action dated Jun. 10, 2009 for U.S. Appl. No. 11/454,519, filed Jun. 16, 2006.
Office Action dated Dec. 30, 2009 for U.S. Appl. No. 11/454,519, filed Jun. 16, 2006.
Office Action dated Jul. 1, 2009 for U.S. Appl. No. 11/436,912, filed May 18, 2006.
Office Action dated Jan. 6, 2010 for U.S. Appl. No. 11/436,912, filed May 18, 2006.
Office Action dated Jul. 21, 2009 for U.S. Appl. No. 11/457,662, filed Jul. 14, 2006.
Office Action dated Dec. 30, 2009 for U.S. Appl. No. 11/457,662, filed Jul. 14, 2006.
Office Action dated Jun. 1, 2009 for U.S. Appl. No. 11/461,242, filed Jul. 31, 2006.
Office Action dated Dec. 30, 2009 for U.S. Appl. No. 11/461,242, filed Jul. 31, 2006.
Office Action dated Oct. 26, 2009 for U.S. Appl. No. 11/454,206, filed Jun. 16, 2006.
Office Action dated Jan. 5, 2010 for U.S. Appl. No. 11/454,517, filed Jun. 16, 2006.
Office Action dated Aug. 31, 2009 for U.S. Appl. No. 11/415,914, filed May 2, 2006.
Office Action dated Jun. 15, 2009 for U.S. Appl. No. 11/425,021, filed Jun. 19, 2006.
Office Action dated Mar. 16, 2010 for U.S. Appl. No. 11/454,220, filed Jun. 16, 2006.
Office Action dated Mar. 18, 2010 for U.S. Appl. No. 11/496,107, filed Jul. 31, 2006.
Office Action dated Mar. 12, 2010 for U.S. Appl. No. 11/416,057, filed May 2, 2006.
Office Action dated Mar. 15, 2010 for U.S. Appl. No. 11/454,519, filed Jun. 16, 2006.
Office Action dated Mar. 15, 2010 for U.S. Appl. No. 11/454,662, filed Jun. 16, 2006.
Office Action dated Mar. 16, 2010 for U.S. Appl. No. 11/461,242, filed Jul. 31, 2006.
Office Action dated Jan. 28, 2010 for U.S. Appl. No. 11/454,219, filed Jun. 16, 2006.
Office Action dated Mar. 31, 2010 for U.S. Appl. No. 11/454,517, filed Jun. 16, 2006.
International Preliminary Report for PCTUS200707/436 dated Oct. 10, 2008.
ISR for PCTUS200707/436 dated Nov. 9, 2007.
Written Opinion of ISR for PCTUS200707/436 dated Nov. 9, 2007.
Extended European Search Report for PCTUS2007010558 dated Apr. 12, 2009.
International Search Report for PCTUS2007011651 dated Mar. 16, 2010.
Office Action dated Sep. 30, 2010 for U.S. Appl. No. 11/425,281 filed Jun. 20, 2006, pp. 1-13.
Korean Office Action mailed Jul. 27, 2010, in Appl. No. 10-2009-7000812, pp. 3-1 to 3-3.
Office Action dated Sep. 13, 2010 for U.S. Appl. No. 11/416,057 filed May 2, 2006, pp. 1-14.
Advisory Action dated Aug. 23, 2010 for U.S. Appl. No. 11/454,517 filed Jun. 16, 2006, pp. 1-2.
Office Action dated Aug. 24, 2010 for U.S. Appl. No. 11/425,021 filed Jun. 19, 2006, pp. 1-19.
International Preliminary Report for PCT/US2007/071159 dated Dec. 16, 2008, pp. 1-7.
Madubata, C., "Prioritization Of The Joint Battle Space Infosphere (JBI) Traffic And Priority With Reciprocity CAC Protocol For The JBI Network," System Theory, 2006 Proceeding of the Thirty-Eighth Southeastern Symposium, USA, IEEE; pp. 477-481, Mar. 5, 2006.
ISR for PCT/US2007/071159 dated Oct. 31, 2007, pp. 1-2.
Advisory Action dated Jul. 23, 2010 for U.S. Appl. No. 11/424,635 filed Jun. 16, 2006, pp. 1-2.
Translation of Japan Office Action for Patent Application No. 2009-509667, mailed Aug. 10, 2010, pp. 1-2.
Advisory Action dated Sep. 30, 2010 for U.S. Appl. No. 11/461,082, filed Jul. 31, 2006, pp. 1-2.
Office Action dated Sep. 17, 2010 for U.S. Appl. No. 11/454,519, filed Jun. 16, 2006, pp. 1-16.
Office Action dated Sep. 14, 2010 for U.S. Appl. No. 11/461,242, filed Jun. 31, 2006, pp. 1-31.

* cited by examiner

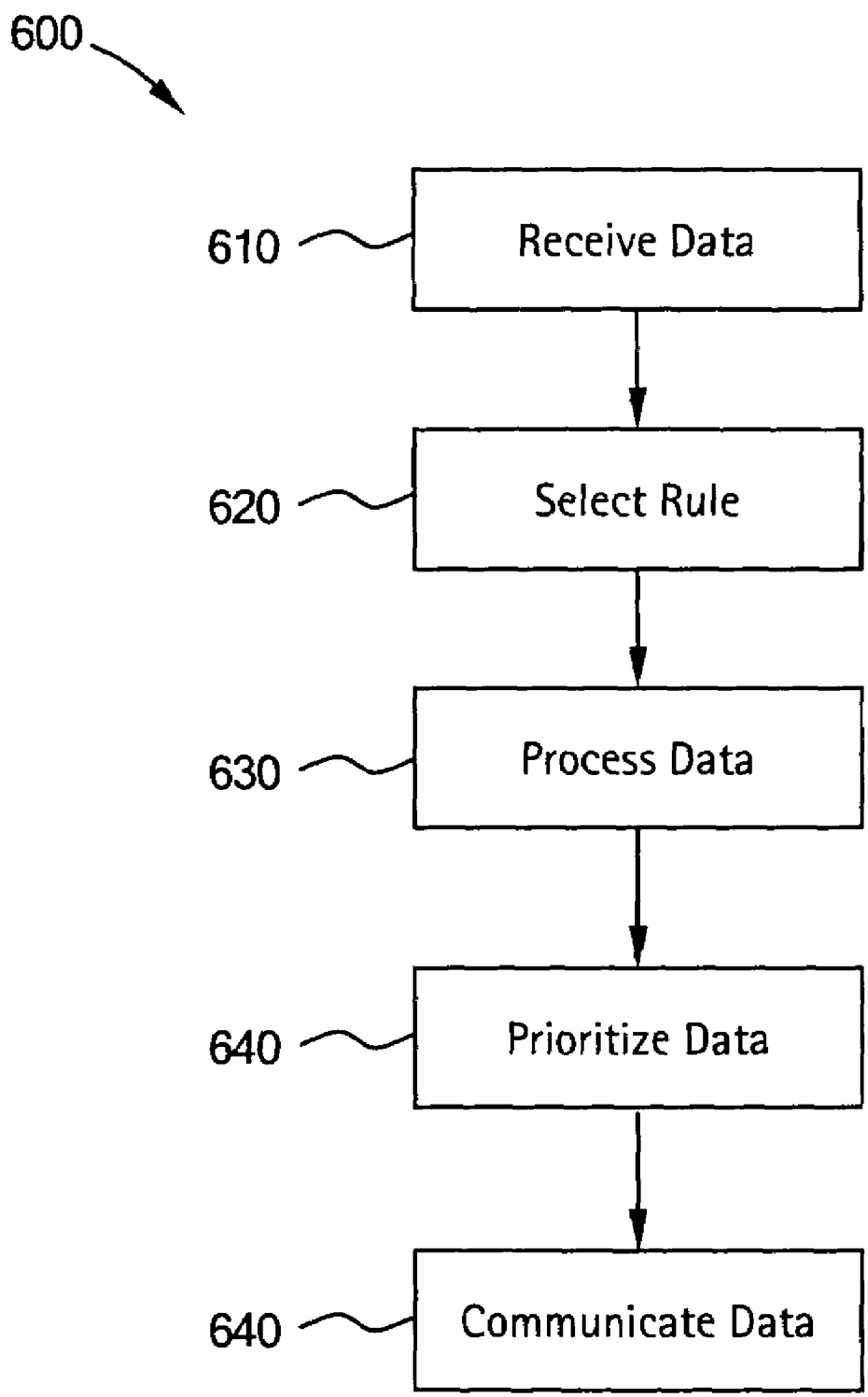

SYSTEM AND METHODS FOR GENERIC DATA TRANSPARENT RULES TO SUPPORT QUALITY OF SERVICE

BACKGROUND OF THE INVENTION

The presently described technology generally relates to communications networks. More particularly, the presently described technology relates to systems and methods for generic data transparent rules to support Quality of Service.

Communications networks are utilized in a variety of environments. Communications networks typically include two or more nodes connected by one or more links. Generally, a communications network is used to support communication between two or more participant nodes over the links and intermediate nodes in the communications network. There may be many kinds of nodes in the network. For example, a network may include nodes such as clients, servers, workstations, switches, and/or routers. Links may be, for example, modem connections over phone lines, wires, Ethernet links, Asynchronous Transfer Mode (ATM) circuits, satellite links, and/or fiber optic cables.

A communications network may actually be composed of one or more smaller communications networks. For example, the Internet is often described as network of interconnected computer networks. Each network may utilize a different architecture and/or topology. For example, one network may be a switched Ethernet network with a star topology and another network may be a Fiber-Distributed Data Interface (FDDI) ring.

Communications networks may carry a wide variety of data. For example, a network may carry bulk file transfers alongside data for interactive real-time conversations. The data sent on a network is often sent in packets, cells, or frames. Alternatively, data may be sent as a stream. In some instances, a stream or flow of data may actually be a sequence of packets. Networks such as the Internet provide general purpose data paths between a range of nodes and carrying a vast array of data with different requirements.

Communication over a network typically involves multiple levels of communication protocols. A protocol stack, also referred to as a networking stack or protocol suite, refers to a collection of protocols used for communication. Each protocol may be focused on a particular type of capability or form of communication. For example, one protocol may be concerned with the electrical signals needed to communicate with devices connected by a copper wire. Other protocols may address ordering and reliable transmission between two nodes separated by many intermediate nodes, for example.

Protocols in a protocol stack typically exist in a hierarchy. Often, protocols are classified into layers. One reference model for protocol layers is the Open Systems Interconnection (OSI) model. The OSI reference model includes seven layers: a physical layer, data link layer, network layer, transport layer, session layer, presentation layer, and application layer. The physical layer is the "lowest" layer, while the application layer is the "highest" layer. Two well-known transport layer protocols are the Transmission Control Protocol (TCP) and User Datagram Protocol (UDP). A well known network layer protocol is the Internet Protocol (IP).

At the transmitting node, data to be transmitted is passed down the layers of the protocol stack, from highest to lowest. Conversely, at the receiving node, the data is passed up the layers, from lowest to highest. At each layer, the data may be manipulated by the protocol handling communication at that layer. For example, a transport layer protocol may add a header to the data that allows for ordering of packets upon arrival at a destination node. Depending on the application, some layers may not be used, or even present, and data may just be passed through.

One kind of communications network is a tactical data network. A tactical data network may also be referred to as a tactical communications network. A tactical data network may be utilized by units within an organization such as a military (e.g., army, navy, and/or air force). Nodes within a tactical data network may include, for example, individual soldiers, aircraft, command units, satellites, and/or radios. A tactical data network may be used for communicating data such as voice, position telemetry, sensor data, and/or real-time video.

An example of how a tactical data network may be employed is as follows. A logistics convoy may be in-route to provide supplies for a combat unit in the field. Both the convoy and the combat unit may be providing position telemetry to a command post over satellite radio links. An unmanned aerial vehicle (UAV) may be patrolling along the road the convoy is taking and transmitting real-time video data to the command post over a satellite radio link also. At the command post, an analyst may be examining the video data while a controller is tasking the UAV to provide video for a specific section of road. The analyst may then spot an improvised explosive device (IED) that the convoy is approaching and send out an order over a direct radio link to the convoy for it to halt and alerting the convoy to the presence of the IED.

The various networks that may exist within a tactical data network may have many different architectures and characteristics. For example, a network in a command unit may include a gigabit Ethernet local area network (LAN) along with radio links to satellites and field units that operate with much lower throughput and higher latency. Field units may communicate both via satellite and via direct path radio frequency (RF). Data may be sent point-to-point, multicast, or broadcast, depending on the nature of the data and/or the specific physical characteristics of the network. A network may include radios, for example, set up to relay data. In addition, a network may include a high frequency (HF) network which allows long rang communication. A microwave network may also be used, for example. Due to the diversity of the types of links and nodes, among other reasons, tactical networks often have overly complex network addressing schemes and routing tables. In addition, some networks, such as radio-based networks, may operate using bursts. That is, rather than continuously transmitting data, they send periodic bursts of data. This is useful because the radios are broadcasting on a particular channel that must be shared by all participants, and only one radio may transmit at a time.

Tactical data networks are generally bandwidth-constrained. That is, there is typically more data to be communicated than bandwidth available at any given point in time. These constraints may be due to either the demand for bandwidth exceeding the supply, and/or the available communications technology not supplying enough bandwidth to meet the user's needs, for example. For example, between some nodes, bandwidth may be on the order of kilobits/sec. In bandwidth-constrained tactical data networks, less important data can clog the network, preventing more important data from getting through in a timely fashion, or even arriving at a receiving node at all. In addition, portions of the networks may include internal buffering to compensate for unreliable links. This may cause additional delays. Further, when the buffers get full, data may be dropped.

In many instances the bandwidth available to a network cannot be increased. For example, the bandwidth available over a satellite communications link may be fixed and cannot effectively be increased without deploying another satellite. In these situations, bandwidth must be managed rather than simply expanded to handle demand. In large systems, network bandwidth is a critical resource. It is desirable for applications to utilize bandwidth as efficiently as possible. In addition, it is desirable that applications avoid "clogging the pipe," that is, overwhelming links with data, when bandwidth is limited. When bandwidth allocation changes, applications should preferably react. Bandwidth can change dynamically due to, for example, quality of service, jamming, signal obstruction, priority reallocation, and line-of-sight. Networks can be highly volatile and available bandwidth can change dramatically and without notice.

In addition to bandwidth constraints, tactical data networks may experience high latency. For example, a network involving communication over a satellite link may incur latency on the order of half a second or more. For some communications this may not be a problem, but for others, such as real-time, interactive communication (e.g., voice communications), it is highly desirable to minimize latency as much as possible.

Another characteristic common to many tactical data networks is data loss. Data may be lost due to a variety of reasons. For example, a node with data to send may be damaged or destroyed. As another example, a destination node may temporarily drop off of the network. This may occur because, for example, the node has moved out of range, the communication's link is obstructed, and/or the node is being jammed. Data may be lost because the destination node is not able to receive it and intermediate nodes lack sufficient capacity to buffer the data until the destination node becomes available. Additionally, intermediate nodes may not buffer the data at all, instead leaving it to the sending node to determine if the data ever actually arrived at the destination.

Often, applications in a tactical data network are unaware of and/or do not account for the particular characteristics of the network. For example, an application may simply assume it has as much bandwidth available to it as it needs. As another example, an application may assume that data will not be lost in the network. Applications which do not take into consideration the specific characteristics of the underlying communications network may behave in ways that actually exacerbate problems. For example, an application may continuously send a stream of data that could just as effectively be sent less frequently in larger bundles. The continuous stream may incur much greater overhead in, for example, a broadcast radio network that effectively starves other nodes from communicating, whereas less frequent bursts would allow the shared bandwidth to be used more effectively.

Certain protocols do not work well over tactical data networks. For example, a protocol such as TCP may not function well over a radio-based tactical network because of the high loss rates and latency such a network may encounter. TCP requires several forms of handshaking and acknowledgments to occur in order to send data. High latency and loss may result in TCP hitting time outs and not being able to send much, if any, meaningful data over such a network.

Information communicated with a tactical data network often has various levels of priority with respect to other data in the network. For example, threat warning receivers in an aircraft may have higher priority than position telemetry information for troops on the ground miles away. As another example, orders from headquarters regarding engagement may have higher priority than logistical communications behind friendly lines. The priority level may depend on the particular situation of the sender and/or receiver. For example, position telemetry data may be of much higher priority when a unit is actively engaged in combat as compared to when the unit is merely following a standard patrol route. Similarly, real-time video data from an UAV may have higher priority when it is over the target area as opposed to when it is merely in-route.

There are several approaches to delivering data over a network. One approach, used by many communications networks, is a "best effort" approach. That is, data being communicated will be handled as well as the network can, given other demands, with regard to capacity, latency, reliability, ordering, and errors. Thus, the network provides no guarantees that any given piece of data will reach its destination in a timely manner, or at all. Additionally, no guarantees are made that data will arrive in the order sent or even without transmission errors changing one or more bits in the data.

Another approach is Quality of Service (QoS). QoS refers to one or more capabilities of a network to provide various forms of guarantees with regard to data that is carried. For example, a network supporting QoS may guarantee a certain amount of bandwidth to a data stream. As another example, a network may guarantee that packets between two particular nodes have some maximum latency. Such a guarantee may be useful in the case of a voice communication where the two nodes are two people having a conversation over the network. Delays in data delivery in such a case may result in irritating gaps in communication and/or dead silence, for example.

QoS may be viewed as the capability of a network to provide better service to selected network traffic. The primary goal of QoS is to provide priority including dedicated bandwidth, controlled jitter and latency (required by some real-time and interactive traffic), and improved loss characteristics. Another important goal is making sure that providing priority for one flow does not make other flows fail. That is, guarantees made for subsequent flows must not break the guarantees made to existing flows.

Current approaches to QoS often require every node in a network to support QoS, or, at the very least, for every node in the network involved in a particular communication to support QoS. For example, in current systems, in order to provide a latency guarantee between two nodes, every node carrying the traffic between those two nodes must be aware of and agree to honor, and be capable of honoring, the guarantee.

There are several approaches to providing QoS. One approach is Integrated Services, or "IntServ." IntServ provides a QoS system wherein every node in the network supports the services and those services are reserved when a connection is set up. IntServ does not scale well because of the large amount of state information that must be maintained at every node and the overhead associated with setting up such connections.

Another approach to providing QoS is Differentiated Services, or "DiffServ." DiffServ is a class of service model that enhances the best-effort services of a network such as the Internet. DiffServ differentiates traffic by user, service requirements, and other criteria. Then, DiffServ marks packets so that network nodes can provide different levels of service via priority queuing or bandwidth allocation, or by choosing dedicated routes for specific traffic flows. Typically, a node has a variety of queues for each class of service. The node then selects the next packet to send from those queues based on the class categories.

As mentioned, existing QoS solutions require at least the nodes involved in a particular communication to support QoS. However, the nodes at the "edge" of network may be adapted to provide some improvement in QoS, even if they are incapable of making total guarantees. Nodes are considered to be at the edge of the network if they are the participating nodes in a communication (i.e., the transmitting and/or receiving nodes) and/or if they are located at chokepoints in the network. A chokepoint is a section of the network where all traffic must pass to another portion. For example, a router or gateway from a LAN to a satellite link would be a choke point, since all traffic from the LAN to any nodes not on the LAN must pass through the gateway to the satellite link.

Existing QoS solutions are often network specific and each network type or architecture may require a different QoS configuration. Due to the mechanisms existing QoS solutions utilize, messages that look the same to current QoS systems may actually have different priorities based on message content. However, data consumers may require access to high-priority data without being flooded by lower-priority data. Existing QoS systems cannot provide QoS based on message content at the transport layer. Further, current systems that look to message connect must be configured to understand a predetermined, fixed data format. That is, current QoS systems that examine message content are only able examine messages with predefined, unchanging formats. Thus, it is highly desirable to have a generic data transparent rules to support QoS.

Thus, there is a need for systems and methods providing QoS in a tactical data network. There is a need for systems and methods for providing QoS on the edge of a tactical data network. Additionally, there is a need for adaptive, configurable QoS systems and methods in a tactical data network. Further, there is a need for systems and methods for generic data transparent rules to support Quality of Service.

BRIEF SUMMARY OF THE INVENTION

Embodiments of the present invention provide systems and methods for facilitating communication of data. A method for prioritizing a block of data to provide content-based quality of service in a network includes receiving a block of data, selecting a selected rule from a set of available rules, processing the block of data, and prioritizing the block of data. The selected rule includes an operation and a key. The block of data is processed according to the selected rule based at least in part on the operation to determine a decision value based at least in part on the key. The block of data is prioritized based at least in part on the decision value.

Certain embodiments provide a system for data communication system for providing content-based quality of service in a network including a rule, a parser component, and a prioritization component. The rule includes an operation and a key. The rule is included in a set of available rules. The parser component is adapted to process data based at least in part on the operation and to match the key to determine a decision value. The prioritization component is adapted to determine a priority for the data based at least in part on the decision value.

Certain embodiments provide a computer-readable medium including a set of instructions for execution on a computer, the set of instructions including a selection routine, a parsing routine, a prioritization routine, and a communication routine. The selection routine is configured to select a selected rule from a set of available rules. The parsing routine is configured to process data utilizing the selected rule to determine a decision value. The prioritization routine is configured to determine a priority for the data based at least in part on the decision value. The communication routine is configured to communicate the data based on the priority.

BRIEF DESCRIPTION OF SEVERAL VIEWS OF THE DRAWINGS

FIG. 6 illustrates a flow diagram for a method for communicating data in accordance with an embodiment of the present invention.

Figure 1:
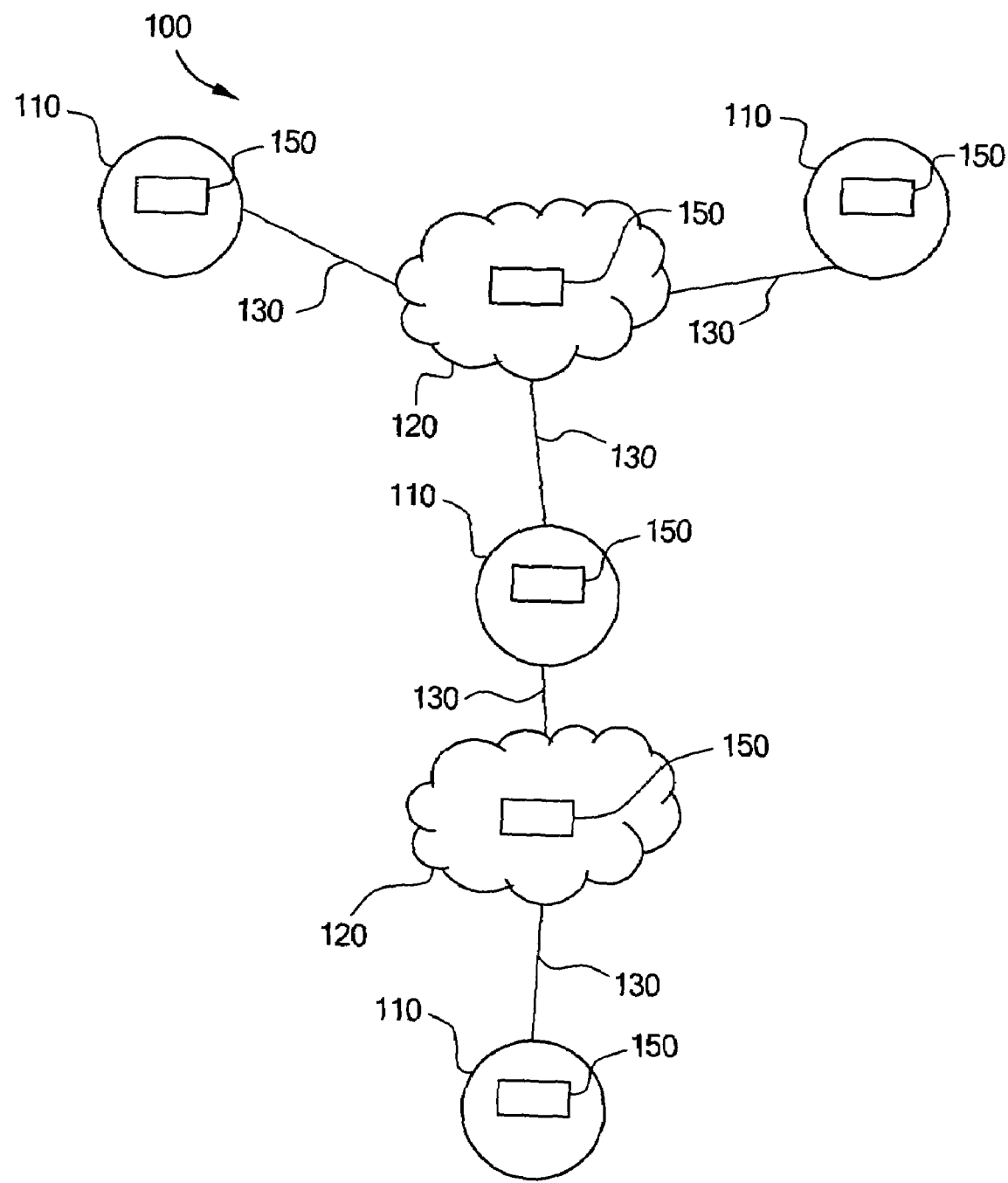
FIG. 1 illustrates a tactical communications network environment operating with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a tactical communications network environment 100 operating with an embodiment of the present invention. The network environment 100 includes a plurality of communication nodes 110, one or more networks 120, one or more links 130 connecting the nodes and network(s), and one or more communication systems 150 facilitating communication over the components of the network environment 100. The following discussion assumes a network environment 100 including more than one network 120 and more than one link 130, but it should be understood that other environments are possible and anticipated.

Communication nodes 110 may be and/or include radios, transmitters, satellites, receivers, workstations, servers, and/or other computing or processing devices, for example.

Network(s) 120 may be hardware and/or software for transmitting data between nodes 110, for example. Network(s) 120 may include one or more nodes 110, for example.

Link(s) 130 may be wired and/or wireless connections to allow transmissions between nodes 110 and/or network(s) 120.

The communications system 150 may include software, firmware, and/or hardware used to facilitate data transmission among the nodes 110, networks 120, and links 130, for example. As illustrated in FIG. 1, communications system 150 may be implemented with respect to the nodes 110, network(s) 120, and/or links 130. In certain embodiments, every node 110 includes a communications system 150. In certain embodiments, one or more nodes 110 include a communications system 150. In certain embodiments, one or more nodes 110 may not include a communications system 150.

Figure 2:
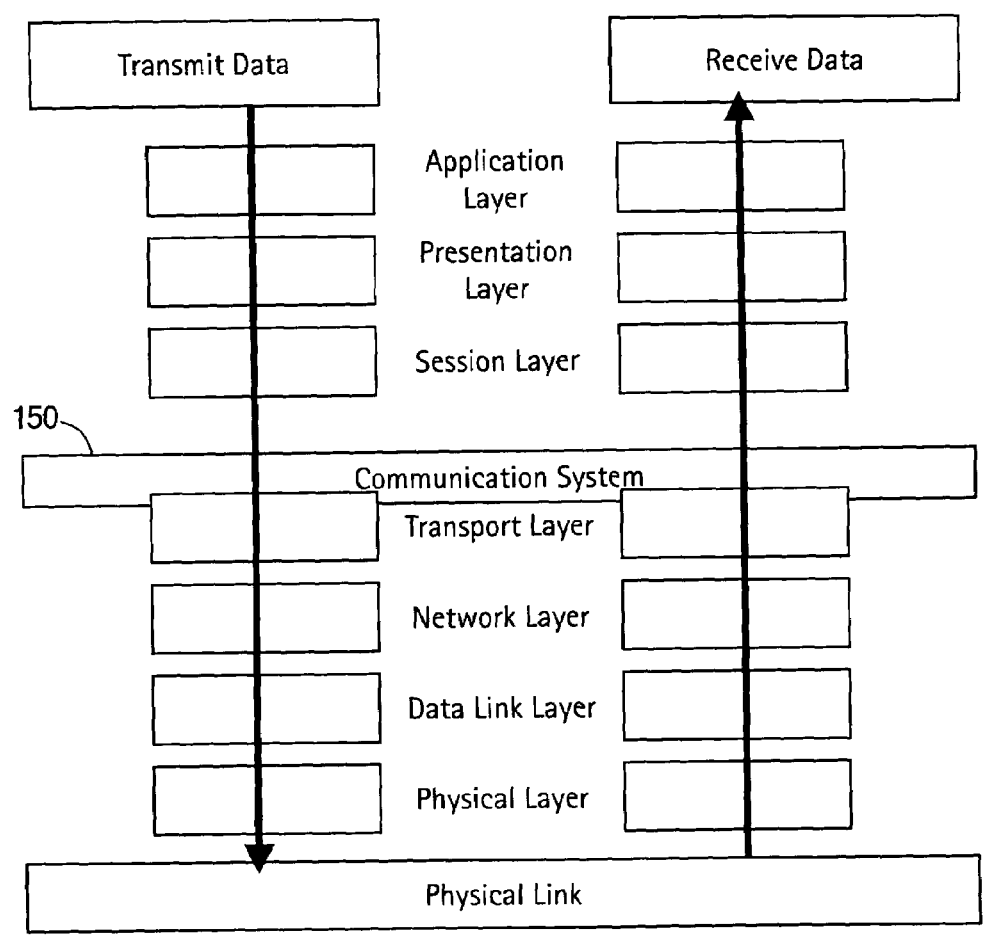
FIG. 2 shows the positioning of the data communications system in the seven layer OSI network model in accordance with an embodiment of the present invention.
Figure 3:
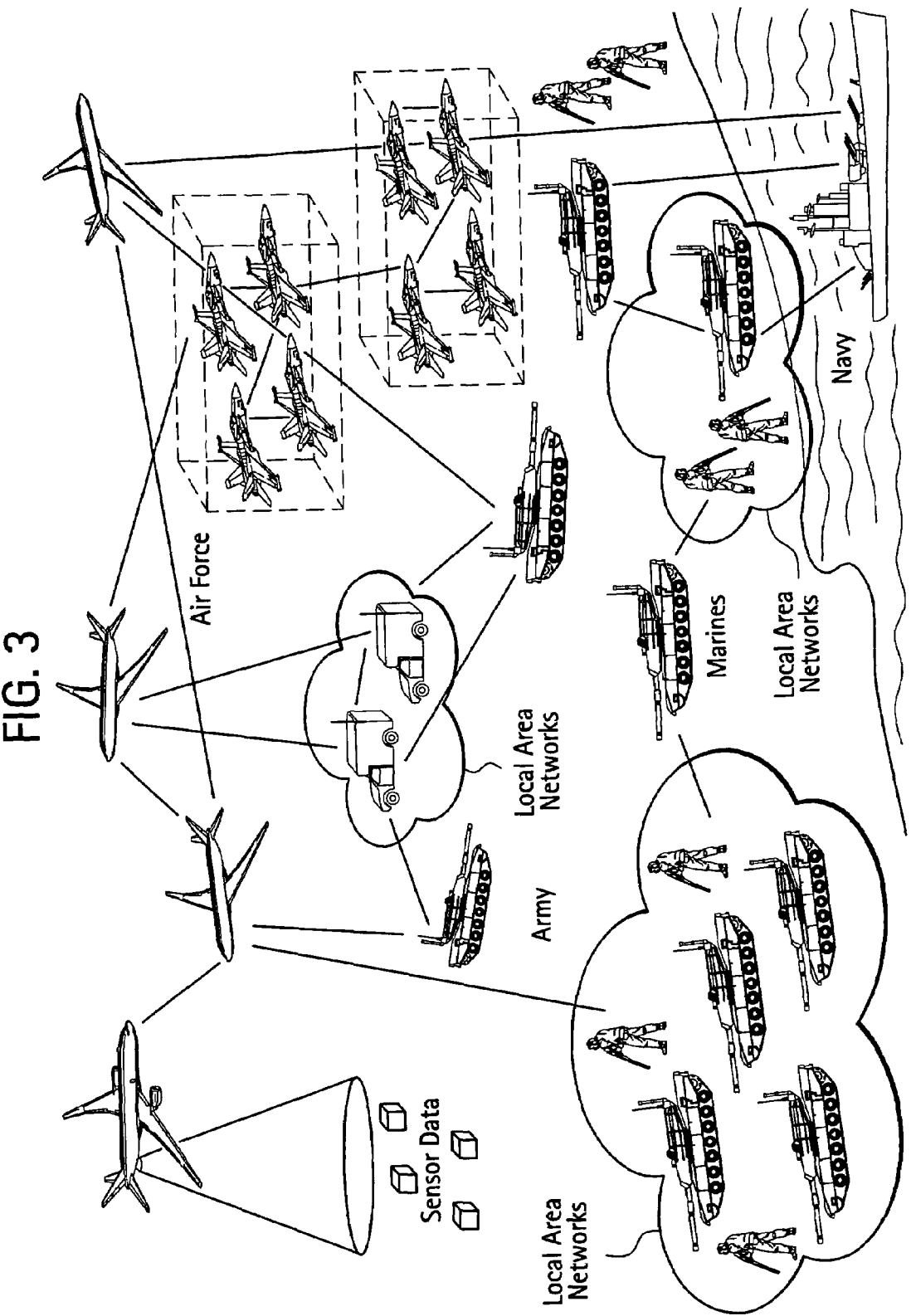
FIG. 3 depicts an example of multiple networks facilitated using the data communications system in accordance with an embodiment of the present invention.

The communication system 150 provides dynamic management of data to help assure communications on a tactical communications network, such as the network environment 100. As shown in FIG. 2, in certain embodiments, the system 150 operates as part of and/or at the top of the transport layer in the OSI seven layer protocol model. The system 150 may give precedence to higher priority data in the tactical network passed to the transport layer, for example. The system 150 may be used to facilitate communications in a single network, such as a local area network (LAN) or wide area network (WAN), or across multiple networks. An example of a multiple network system is shown in FIG. 3. The system 150 may be used to manage available bandwidth rather than add additional bandwidth to the network, for example.

In certain embodiments, the system 150 is a software system, although the system 150 may include both hardware and software components in various embodiments. The system 150 may be network hardware independent, for example. That is, the system 150 may be adapted to function on a variety of hardware and software platforms. In certain embodiments, the system 150 operates on the edge of the network rather than on nodes in the interior of the network. However, the system 150 may operate in the interior of the network as well, such as at "choke points" in the network.

The system 150 may use rules and modes or profiles to perform throughput management functions such as optimizing available bandwidth, setting information priority, and managing data links in the network. By "optimizing" bandwidth, it is meant that the presently described technology can be employed to increase an efficiency of bandwidth use to communicate data in one or more networks. Optimizing bandwidth usage may include removing functionally redundant messages, message stream management or sequencing, and message compression, for example. Setting information priority may include differentiating message types at a finer granularity than Internet Protocol (IP) based techniques and sequencing messages onto a data stream via a selected rule-based sequencing algorithm, for example. Data link management may include rule-based analysis of network measurements to affect changes in rules, modes, and/or data transports, for example. A mode or profile may include a set of rules related to the operational needs for a particular network state of health or condition. The system 150 provides dynamic, "on-the-fly" reconfiguration of modes, including defining and switching to new modes on the fly.

The communication system 150 may be configured to accommodate changing priorities and grades of service, for example, in a volatile, bandwidth-limited network. The system 150 may be configured to manage information for improved data flow to help increase response capabilities in the network and reduce communications latency. Additionally, the system 150 may provide interoperability via a flexible architecture that is upgradeable and scalable to improve availability, survivability, and reliability of communications. The system 150 supports a data communications architecture that may be autonomously adaptable to dynamically changing environments while using predefined and predictable system resources and bandwidth, for example.

In certain embodiments, the system 150 provides throughput management to bandwidth-constrained tactical communications networks while remaining transparent to applications using the network. The system 150 provides throughput management across multiple users and environments at reduced complexity to the network. As mentioned above, in certain embodiments, the system 150 runs on a host node in and/or at the top of layer four (the transport layer) of the OSI seven layer model and does not require specialized network hardware. The system 150 may operate transparently to the layer four interface. That is, an application may utilize a standard interface for the transport layer and be unaware of the operation of the system 150. For example, when an application opens a socket, the system 150 may filter data at this point in the protocol stack. The system 150 achieves transparency by allowing applications to use, for example, the TCP/IP socket interface that is provided by an operating system at a communication device on the network rather than an interface specific to the system 150. System 150 rules may be written in extensible markup language (XML) and/or provided via custom dynamic link libraries (DLLs), for example.

In certain embodiments, the system 150 provides quality of service (QoS) on the edge of the network. The system's QoS capability offers content-based, rule-based data prioritization on the edge of the network, for example. Prioritization may include differentiation and/or sequencing, for example. The system 150 may differentiate messages into queues based on user-configurable differentiation rules, for example. The messages are sequenced into a data stream in an order dictated by the user-configured sequencing rule (e.g., starvation, round robin, relative frequency, etc.). Using QoS on the edge, data messages that are indistinguishable by traditional QoS approaches may be differentiated based on message content, for example. Rules may be implemented in XML, for example. In certain embodiments, to accommodate capabilities beyond XML and/or to support extremely low latency requirements, the system 150 allows dynamic link libraries to be provided with custom code, for example.

Inbound and/or outbound data on the network may be customized via the system 150. Prioritization protects client applications from high-volume, low-priority data, for example. The system 150 helps to ensure that applications receive data to support a particular operational scenario or constraint.

In certain embodiments, when a host is connected to a LAN that includes a router as an interface to a bandwidth-constrained tactical network, the system may operate in a configuration known as QoS by proxy. In this configuration, packets that are bound for the local LAN bypass the system and immediately go to the LAN. The system applies QoS on the edge of the network to packets bound for the bandwidth-constrained tactical link.

In certain embodiments, the system 150 offers dynamic support for multiple operational scenarios and/or network environments via commanded profile switching. A profile may include a name or other identifier that allows the user or system to change to the named profile. A profile may also include one or more identifiers, such as a functional redundancy rule identifier, a differentiation rule identifier, an archival interface identifier, a sequencing rule identifier, a pre-transmit interface identifier, a post-transmit interface identifier, a transport identifier, and/or other identifier, for example. A functional redundancy rule identifier specifies a rule that detects functional redundancy, such as from stale data or substantially similar data, for example. A differentiation rule identifier specifies a rule that differentiates messages into queues for processing, for example. An archival interface identifier specifies an interface to an archival system, for example. A sequencing rule identifier identifies a sequencing algorithm that controls samples of queue fronts and, therefore, the sequencing of the data on the data stream. A pre-transmit interface identifier specifies the interface for pre-transmit processing, which provides for special processing such as encryption and compression, for example. A post-transmit interface identifier identifies an interface for post-transmit processing, which provides for processing such as de-encryption and decompression, for example. A transport identifier specifies a network interface for the selected transport.

A profile may also include other information, such as queue sizing information, for example. Queue sizing information identifiers a number of queues and amount of memory and secondary storage dedicated to each queue, for example.

In certain embodiments, the system 150 provides a rules-based approach for optimizing bandwidth. For example, the system 150 may employ queue selection rules to differentiate messages into message queues so that messages may be assigned a priority and an appropriate relative frequency on the data stream. The system 150 may use functional redundancy rules to manage functionally redundant messages. A message is functionally redundant if it is not different enough (as defined by the rule) from a previous message that has not yet been sent on the network, for example. That is, if a new message is provided that is not sufficiently different from an older message that has already been scheduled to be sent, but has not yet been sent, the newer message may be dropped, since the older message will carry functionally equivalent information and is further ahead in the queue. In addition, functional redundancy many include actual duplicate messages and newer messages that arrive before an older message has been sent. For example, a node may receive identical copies of a particular message due to characteristics of the underlying network, such as a message that was sent by two different paths for fault tolerance reasons. As another example, a new message may contain data that supersedes an older message that has not yet been sent. In this situation, the system 150 may drop the older message and send only the new message. The system 150 may also include priority sequencing rules to determine a priority-based message sequence of the data stream. Additionally, the system 150 may include transmission processing rules to provide pre-transmission and post-transmission special processing, such as compression and/or encryption.

In certain embodiments, the system 150 provides fault tolerance capability to help protect data integrity and reliability. For example, the system 150 may use user-defined queue selection rules to differentiate messages into queues. The queues are sized according to a user-defined configuration, for example. The configuration specifies a maximum amount of memory a queue may consume, for example. Additionally, the configuration may allow the user to specify a location and amount of secondary storage that may be used for queue overflow. After the memory in the queues is filled, messages may be queued in secondary storage. When the secondary storage is also full, the system 150 may remove the oldest message in the queue, logs an error message, and queues the newest message. If archiving is enabled for the operational mode, then the de-queued message may be archived with an indicator that the message was not sent on the network.

Memory and secondary storage for queues in the system 150 may be configured on a per-link basis for a specific application, for example. A longer time between periods of network availability may correspond to more memory and secondary storage to support network outages. The system 150 may be integrated with network modeling and simulation applications, for example, to help identify sizing to help ensure that queues are sized appropriately and time between outages is sufficient to help achieve steady-state and help avoid eventual queue overflow.

Furthermore, in certain embodiments, the system 150 offers the capability to meter inbound ("shaping") and outbound ("policing") data. Policing and shaping capabilities help address mismatches in timing in the network. Shaping helps to prevent network buffers form flooding with high-priority data queued up behind lower-priority data. Policing helps to prevent application data consumers from being overrun by low-priority data. Policing and shaping are governed by two parameters: effective link speed and link proportion. The system 150 may form a data stream that is no more than the effective link speed multiplied by the link proportion, for example. The parameters may be modified dynamically as the network changes. The system may also provide access to detected link speed to support application level decisions on data metering. Information provided by the system 150 may be combined with other network operations information to help decide what link speed is appropriate for a given network scenario.

Figure 4:
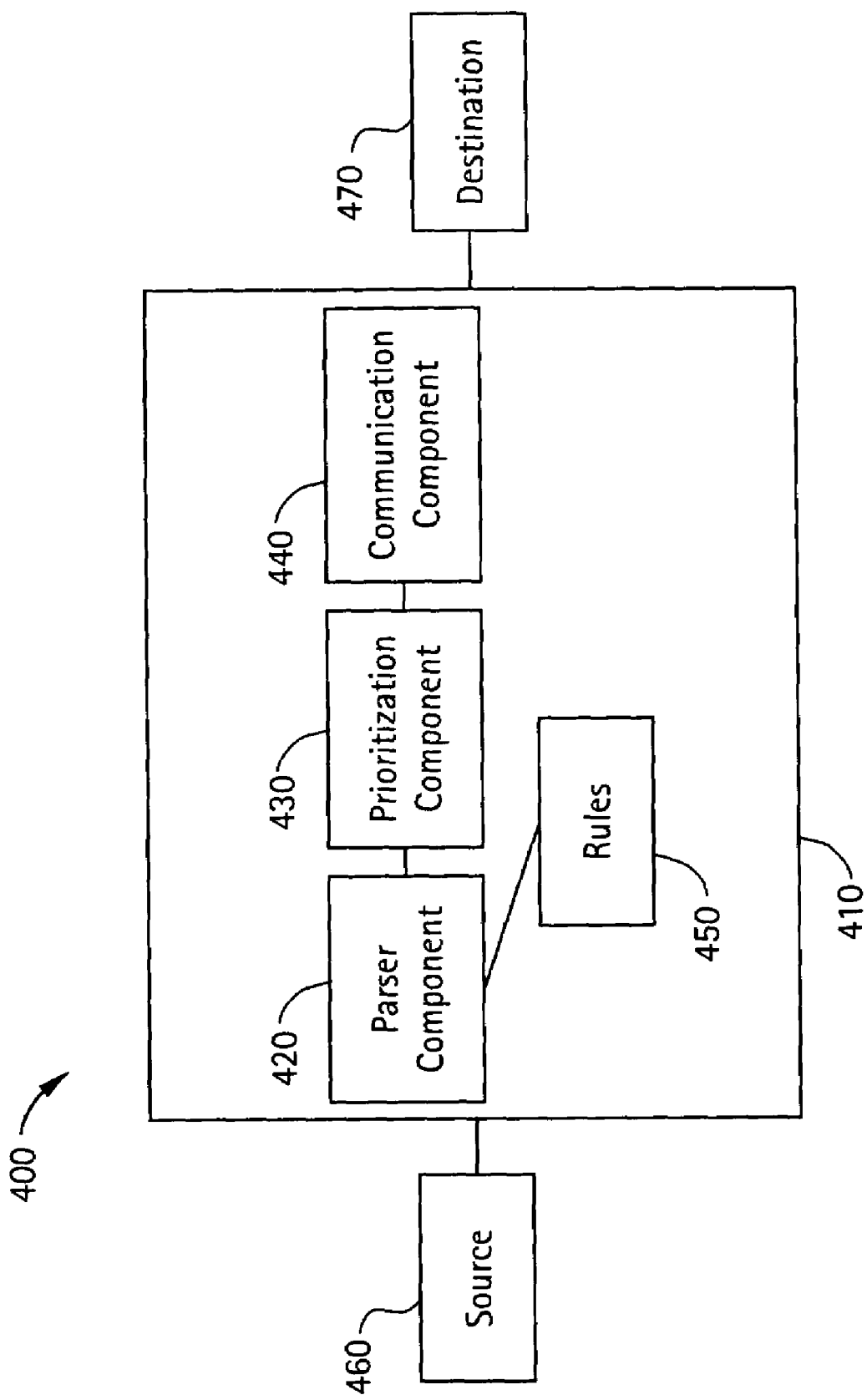
FIG. 4 illustrates a data communication environment operating with an embodiment of the present invention.

FIG. 4 illustrates a data communication environment 400 operating with an embodiment of the present invention. The environment 400 includes a data communication system 410, a source nodes 460, and a destination node 470. The data communication system 410 includes a parser component 420, a prioritization component 430, a communication component 440, and one or more rules 450.

The data communication system 410 is in communication with the source node 460 and the destination node 470. The data communication system 410 may communicate with the source node 460 and/or destination node 470 over links, such as radio, satellite, network links, and/or through inter-process communication. In certain embodiments, a link is part of a tactical data network. In certain embodiments, a link is bandwidth constrained. In certain embodiments, a link is unreliable and/or intermittently disconnected.

In certain embodiments, the data communication system 410 is in communication with two or more source nodes 460. In certain embodiments, the data communication system 410 is in communication with two or more destination nodes 470.

The parser component 420 is in communication with the prioritization component 430. The prioritization component 430 is in communication with the communication component 440.

The data communication system 410 may be similar to the communication system 150, described above, for example. In certain embodiments, the data communication system 410 is adapted to receive data from the source node 460. In certain embodiments, the data communication system 410 is adapted to communicate data to the destination node 470.

In operation, data is received at the data communication system 410. The data may be received from the source node 460, for example. The data may be parsed by the data communication system 410. For example, the data may be parsed to determine a decision value regarding the data. The data may be prioritized by the data communication system 410. For example, the data may be prioritized based at least in part on the parsing of the data. The data may be communicated by the data communication system 410. For example, the data may be communicated to the destination node 470.

The data received, stored, prioritized, processed, communicated, and/or transmitted by data communication system 410 may include a block of data. The block of data may be, for example, a packet, cell, frame, and/or stream. For example, the data communication system 410 may receive packets of data from the source node 460. As another example, the data communication system 410 may process a stream of data from the source node 460.

In certain embodiments, the data includes a header and a payload. In certain embodiments, the data is not contiguous in memory. That is, one or more portions of the data may be located in different regions of memory. For example, header information may be stored in one region of memory while the payload is stored in another buffer.

The data may be received over one or more links, for example. For example, data may be received at the data communication system 410 from a radio over a tactical data network. As another example, data may be provided to the data communication system 410 by an application running on the same system by an inter-process communication mechanism. As discussed above, the data may be a block of data, for example.

Data is received by the data communication system 410. In certain embodiments, the data communication system 410 may not receive all of the data. For example, some of the data may be stored in a buffer and the data communication system 410 may receive only header information and a pointer to the buffer. For example, the data communication system 410 may be hooked into the protocol stack of an operating system and when an application passes data to the operating system through a transport layer interface (e.g., sockets), the operating system may then provide access to the data to the data communication system 410.

The source node 460 provides and/or generates, at least in part, data handled by the data communication system 410. The source node 460 may include, for example, an application, radio, satellite, or network. The source node 460 may communicate with the data communication system 410 over a link, as discussed above. The source node 460 may generate a continuous stream of data or may burst data, for example. In certain embodiments, the source node 460 and the data communication system 410 are part of the same system. For example, the source node 460 may be an application running on the same computer system as the data communication system 410.

The destination node 470 receives data from the data communication system 410. The destination node 470 may include, for example, an application, radio, satellite, or network. The destination node 470 may communicate with the data communication system 410 over a link, as discussed above. In certain embodiments, the destination node 470 and the data communication system 410 are part of the same system. For example, the destination node 470 may be an application running on the same computer system as the data communication system 410.

The parser component 420 is adapted to parse data. The data may be received from the source node 460, for example. The parser component 420 may examine and/or process the data. For example, the parser component 420 may examine the data to perform an operation. The result of the operation may be used by the parser component 420 to determine a decision value. For example, the parser component 420 may search the data for a particular value and if the value is found, the parser component 420 may generate a decision value indicating the value was found. Alternatively, if the value is not found, the parser component 420 may generate a decision value indicating the value was not found. The decision value may be a flag, integer, or enumerated value, for example. The decision value may represent the status or result of parsing the data, for example.

In certain embodiments, the parser component 420 is adapted to parse data based at least in part on one or more rules 450. For example, the parser component 420 may parse the data using one or more of the rules 450 in a set of available rules. A rule may include an operation and a key. An operation may direct, specify, and/or instruct the parser component 420 on how to process or examine the data, for example. For example, an operation might indicate to the parser component 420 that the value of a particular byte in the data should be examined and compared to the key value.

Operations may include offset and scan operations, for example. An offset operation indicates that the parser component 420 should examine a value, such as a byte or word, in the data offset from the current position by some amount. For example, an "offset 4" operation may indicate that the fourth byte from the present position in the data should be examined. As another example, a "scan 7" operation may indicate that the sequence of seven words from the current position in the data should be examined and compared to a particular key value.

The key value in a rule specifies a value for use in a comparison or other purpose for a given operation. For example, a rule with a "scan 7" operation may have a key value of "0x0321," indicating that the next seven bytes of the data should be scanned to see if any match the key value "0x0321."

As mentioned above, the parser component 420 may parse the data using one or more rules 450. The rules 450 in the set of rules used to parse the data may be processed sequentially or in parallel, for example. In certain embodiments, some or all of the rules 450 may be parsed at about the time. In certain embodiments, one or more rules 450 may be processed starting from the beginning of the data. In certain embodiments, one or more rules 450 may be processed starting from where the processing of a prior rule stopped.

In certain embodiments, the rules in the set of rules may depend on a mode or profile. For example, the rules in a particular set of rules may depend on an active mode or profile of the data communication system 410. That is, different modes may have different rules 450 associated with them. In certain embodiments, one or rules are defined at least in part by a user. In certain embodiments, rules may be written in XML and/or provided via custom DLLs, for example. In certain embodiments, to accommodate capabilities beyond XML and/or to support extremely low latency requirements, a dynamic link library may be provided with custom code to implement a rule, for example.

In certain embodiments, the parser component 420 processes the data without regard to the format of the data. That is, the parser component 420 processes the data according to the rules 450 without regard to the data source, format, or type. Thus, the data may not be in a predetermined format. The data may be viewed by the parser component 420 as an array of bytes. Alternatively, the data may be viewed by the parser component 420 as an array of bits or 16-bit, 32-bit, or 64-bit words, for example. The representation of the data by the parser component 420 does not depend on the actual format of the data.

The prioritization component 430 is adapted to prioritize and/or data. The data may be received from the parser component 420. The prioritization component 430 is adapted to prioritize the data based at least in part on a decision value for the data. The decision value may be the decision value determined by the parser component 420, described above, for example.

In certain embodiments, the prioritization component 430 may include one or more queues for storing, organizing, and/or prioritizing the data. Alternatively, other data structures may be used for storing, organizing, and/or prioritizing the data. For example, a table, tree, or linked list may be used.

In certain embodiments, the prioritization component 430 may determine a priority for a block of data. For example, a priority for a block of data may be determined based at least in part on a decision value determined by the parsing component 420. A block of data may be stored in a queue and/or may be extracted from a queue based on the priority determined for the block of data and/or for the queue.

The prioritization of the data by the prioritization component 430 may be used to provide QoS, for example. For example, the prioritization component 430 may determine a priority for data received over a tactical data network. In certain embodiments, the priority is based at least in part on content. For example, the data may be examined by the parser component 420. The priority may be based on a decision value supplied by the parser component 420, for example. For example, the parser component 420 may indicate to the prioritization component 430 that the data is a video conference between generals and, thus, should be given a higher priority. As another example, the parser component 420 may indicate that the data is position telemetry data from a ground unit far away from the aircraft receiving the data and, thus, is lower priority. The priority may be used to determine which of a plurality of queues the data should be placed into for subsequent communication by the data communication system 410. For example, higher priority data may be placed in a queue intended to hold higher priority data, and in turn, the data communication system 410, in determining what data to next communicate may look first to the higher priority queue.

The communication component 440 is adapted to communicate data. The data to be communicated may be received from the prioritization component 430. The data to be communicated may be selected based at least in part on a priority for the data, for example. For example, the communication component 440 may select a block of data from a queue in the prioritization component 430 to communicate to the destination node 470.

The data may be communicated to one or more destination nodes 470, for example. The data may be communicated over one or more links, for example. For example, the data may be communicated by the data communication system 410 over a tactical data network to a radio. As another example, data may be provided by the data communication system 410 to an application running on the same system by an inter-process communication mechanism.

In certain embodiments, the data communication system 410 does not drop data. That is, although data may be low priority, it is not dropped by the data communication system 410. Rather, the data may be delayed for a period of time, potentially dependent on the amount of higher priority data that is received.

In certain embodiments, the data communication system 410 includes a mode or profile indicator. The mode indicator may represent the current mode or state of the data communication system 410, for example. As discussed above, the data communications system 410 may use rules and modes or profiles to perform throughput management functions such as optimizing available bandwidth, setting information priority, and managing data links in the network. The different modes may affecting changes in rules, modes, and/or data transports, for example. For example, different modes may have different rules 450 associated with them. That is, one set of rules 450 may be utilized by the parser component 420, for example, in mode A, and a different, although potentially overlapping, set of rules 450 may be utilized in mode B. A mode or profile may include a set of rules related to the operational needs for a particular network state of health or condition. The data communication system 410 may provide dynamic reconfiguration of modes, including defining and switching to new modes "on-the-fly," for example.

In certain embodiments, the data communication system 410 is transparent to other applications. For example, the processing, organizing, and/or prioritization performed by the data communication system 410 may be transparent to one or more source nodes 460 or other applications or data sources. For example, an application running on the same system as data communication system 410, or on a source node 460 connected to the data communication system 410, may be unaware of the prioritization of data performed by the data communication system 410.

In one embodiment, for example, a bandwidth-constrained network, such as a tactical data network, includes one or more source nodes and one or more destination nodes. The nodes may be aircraft radios, satellites, and/or software applications, for example. The data from the source node(s) is communicated to the data communication system. The data communication system may be on the same node as a source node, a destination node, or on an intermediate node. For example, the data communication system may be on a fighter aircraft, with source nodes such as an application on the aircraft, other aircraft in the squadron, a headquarters unit, and a ground unit. The data may be communicated over a link such as a satellite link, a radio link, and/or inter-process communication. The data from the source node(s) is transparently parsed according to rules, without regard to the format of the data, to determine a priority for the data. For example, the data may include XML elements in an arbitrary order. That is, in different blocks of data, an XML element indicating the sender of the block may appear in different places in the block. The data communication system may determine by parsing the data using the user-defined rules (e.g., a scan operation) that the data is a video conference between generals and, thus, should be given a higher priority. As another example, the data communication system may determine by parsing the data using the rules that the data is position telemetry data from a ground unit far away from the aircraft receiving the data and, thus, is lower priority. The priority may be used to determine which of a plurality of queues the data should be placed into for subsequent communication by the data communication system. For example, higher priority data may be placed in a queue intended to hold higher priority data, and in turn, the data communication system, in determining what data to next communicate may look first to the higher priority queue.

As discussed above, the components, elements, and/or functionality of the data communication system 410 may be implemented alone or in combination in various forms in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Figure 5:
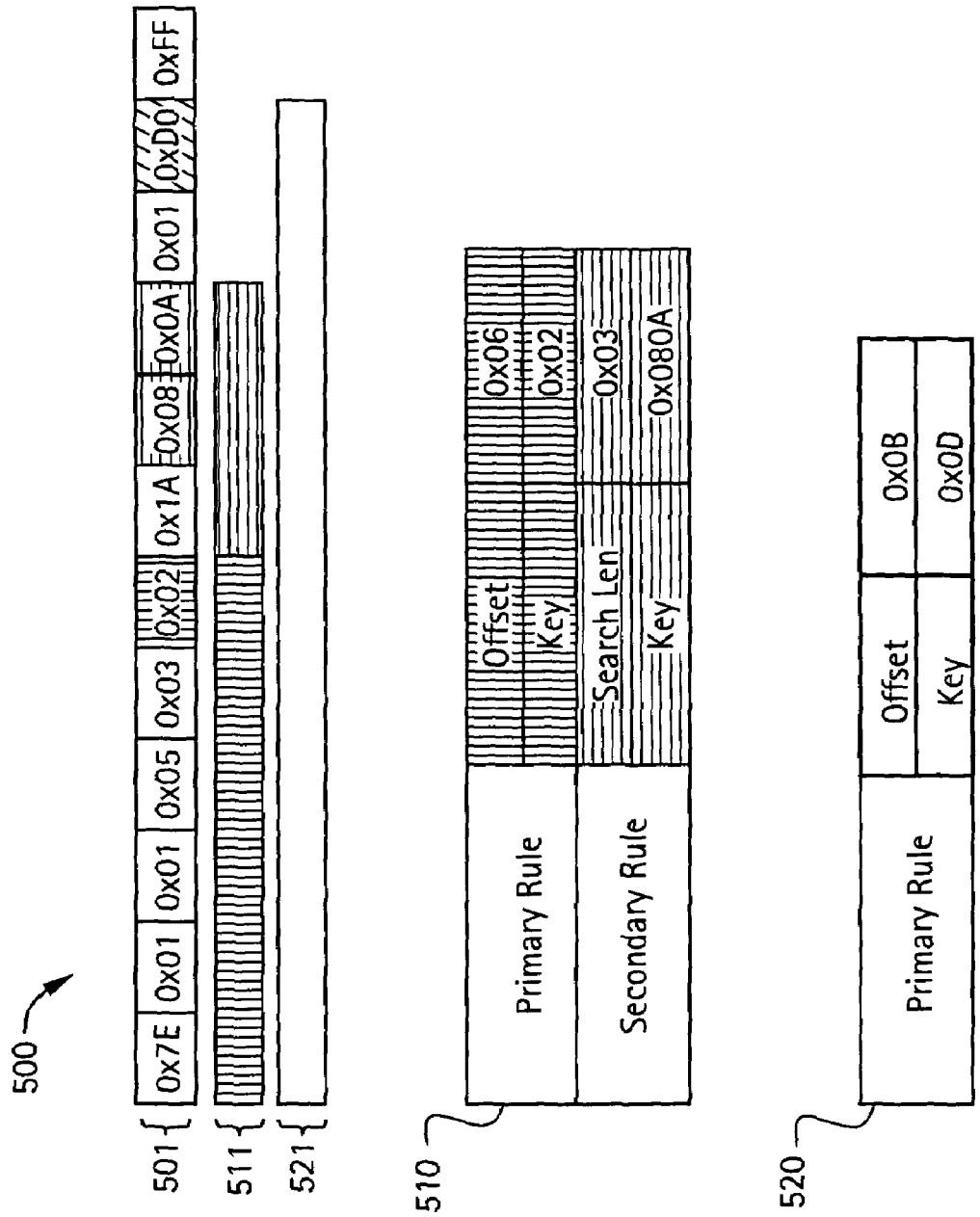
FIG. 5 illustrates examples of parsing data using rules according to an embodiment of the present invention.

FIG. 5 illustrates examples 500 of parsing data using rules according to an embodiment of the present invention. More particularly, FIG. 5 illustrates a block of data 501, a first example 510, and a second example 510. The block of data 501 is illustrated as an array of bytes. The first example 510 includes two rules, a primary rule and a secondary rule. The second example 520 includes a primary rule. In addition, FIG. 5 illustrates the execution 511 of example 510 and the execution 521 of example 520.

The block of data 501 may be processed by the parsing component 420, for example. In each example, the block of data 501 is parsed using the rules specified in the example. For example, the execution 511 illustrates the parsing of the block of data 501 using the primary and secondary rules in the first example 510. Similarly, the execution 521 illustrates the parsing of the block of data 501 using the primary rule in the second example 520. The rules in each example may be similar to the rules 450 discussed above, for example.

Each rule includes an operation and a key. For example, in the first example 510, the primary rule has an operation of "offset 0x06" and a key of "0x02." The secondary rule has an operation of "Search Len 0x03" and a key of "0x080A." In the second example 520, the primary rule has an operation of "offset 0x0B" and a key of "0x0D." That is, an operation of "offset 11" and a key of "13."

An operation may direct, specify, and/or instruct the parser component 420 on how to process or examine the data, for example. For example, an operation might indicate to the parser component 420 that the value of a particular byte in the data should be examined and compared to the key value.

Operations may include offset and scan operations, for example. An offset operation indicates that a value, such as a byte or word, in the data offset from the current position by some amount should be examined. For example, an "offset 4" operation may indicate that the fourth byte from the present position in the data should be examined. As another example, a "scan 7" operation may indicate that the sequence of seven words from the current position in the data should be examined and compared to a particular key value.

The key value in a rule specifies a value for use in a comparison or other purpose for a given operation. For example, a rule with a "scan 7" operation may have a key value of "0x0321," indicating that the next seven bytes of the data should be scanned to see if any match the key value "0x0321."

The rules in the set of rules used to parse the data may be processed sequentially or in parallel, for example. In certain embodiments, some or all of the rules may be parsed at about the time. In certain embodiments, one or more rules may be processed starting from the beginning of the data. In certain embodiments, one or more rules may be processed starting from where the processing of a prior rule stopped.

In the first example 510, the primary rule is used to parse the block of data 501. The primary rule has an operation specifying an offset of six bytes. The sixth byte is examined and its value is compared to the key. Here, the value of the sixth byte it "0x02," which matches the key for the primary rule of "0x02." Thus, the secondary rule will be processed. The secondary rule has an operation specifying a search operation over three bytes looking for the key of "0x080A." Here, the block of data 501 continues to be processed from the stopping point of the last operation and up to the next three bytes are examined looking for a match to the specified key. As illustrated, the key is matched. Thus, the block of data 501 has been parsed using the rules in the first example 501. The parsing component 420 may generated a decision value based on the outcome of this processing. For example, a decision value may indicate that the rules were successfully processed. The decision value may then been interpreted by the priority component 430 to determine a priority for the block of data 501, for example.

In the second example 520, the primary rule is used to parse the block of data 501. The primary rule has an operation specifying an offset of 11 bytes. The eleventh byte is examined and its value is compared to the key. Here, the value of the eleventh byte is "0xD0," which does not match the key for the primary rule of "0x0D." The parsing component 420 may generate a decision value based on the outcome of this processing. For example, a decision value may indicate that the rule was not successfully processed. The decision value may then be interpreted by the priority component 430 to determine a priority for the block of data 501, for example.

As mentioned above, the block 501 is illustrated as an array of bytes. Alternatively, the block of data 501 may be viewed by the parser component 420 as an array of bits or 16-bit, 32-bit, or 64-bit words, for example. The representation of the block of data 501 by the parser component 420 does not depend on the actual format of the data.

FIG. 6 illustrates a flow diagram for a method 600 for communicating data in accordance with an embodiment of the present invention. The method 600 includes the following steps, which will be described below in more detail. At step 610, data is received. At step 620, a rule is selected. At step 630, data is processed. At step 640, data is prioritized. At step 650, data is communicated. The method 600 is described with reference to elements of systems described above, but it should be understood that other implementations are possible.

At step 610, data is received. Data may be received at the data communication system 410, for example. As another example, data may be received at the parser component 420. The data may be received over one or more links, for example. The data may be provided and/or generated by one or more data sources 460, for example. For example, data may be received at the parser component 420 from a radio over a tactical data network. As another example, data may be provided to the data communication system 410 by an application running on the same system by an inter-process communication mechanism. As discussed above, the data may be a block of data, for example.

In certain embodiments, not all of the data may be received. For example, some of the data may be stored in a buffer and only header information and a pointer to the buffer are received. For example, the data communication system 410 may be hooked into the protocol stack of an operating system, and, when an application passes data to the operating system through a transport layer interface (e.g., sockets), the operating system may then provide access to the data to the data communication system 410.

At step 620, a rule is selected. The selected rule may be similar to the rule 450, described above, for example. The rule may be selected from a set of available rules, for example. The rule may be selected by a parsing component. The parsing component may be similar to the parsing component 420, described above, for example.

Each rule includes an operation and a key. An operation may direct, specify, and/or instruct the parser component 420 on how to process or examine the data, for example. For example, an operation might indicate to the parser component 420 that the value of a particular byte in the data should be examined and compared to the key value.

Operations may include offset and scan operations, for example. An offset operation indicates that a value, such as a byte or word, in the data offset from the current position by some amount should be examined. For example, an "offset 4" operation may indicate that the fourth byte from the present position in the data should be examined. As another example, a "scan 7" operation may indicate that the sequence of seven words from the current position in the data should be examined and compared to a particular key value.

The key value in a rule specifies a value for use in a comparison or other purpose for a given operation. For example, a rule with a "scan 7" operation may have a key value of "0x0321," indicating that the next seven bytes of the data should be scanned to see if any match the key value "0x0321."

At step 630, data is processed. The data to be processed may be the data received at step 610, described above, for example. The data may be processed by a parser component. The parser component may be similar to the parser component 420, described above, for example. The data may be processed based at least in part on one or more rules. The rule(s) may include the rule selected at step 620, described above, for example. That is, the data may be processed according to the selected rule, selected at step 620, for example. The rules may be similar to the rules 450, described above, for example.

As mentioned above, a rule may include an operation and a key. An operation may be used to direct, specify, and/or instruct how to process or examine the data, for example. For example, an operation might indicate that the value of a particular byte in the data should be examined and compared to the key value.

The operation specified in a rule may be similar to those operations discussed above, for example. Operations may include offset and scan operations, for example. An offset operation indicates that a value, such as a byte or word, in the data offset from the current position by some amount should be examined. For example, an "offset 4" operation may indicate that the fourth byte from the present position in the data should be examined. As another example, a "scan 7" operation may indicate that the sequence of seven words from the current position in the data should be examined and compared to a particular key value.

The key value may be similar to the key values discussed above, for example. The key value in a rule specifies a value for use in a comparison or other purpose for a given operation. For example, a rule with a "scan 7" operation may have a key value of "0x0321," indicating that the next seven bytes of the data should be scanned to see if any match the key value "0x0321."

The processing of the data may be used to determine a decision value. For example, the processing of the data may include searching the data for a particular value and if the value is found, a decision value indicating the value was found may be generated. Alternatively, if the value is not found, a decision value indicating the value was not found may be generated. The decision value may be a flag, integer, or enumerated value, for example. The decision value may represent the status or result of parsing the data, for example.

In certain embodiments, the processing of the data occurs without regard to the format of the data. That is, the data may be processed according to the rules 450 without regard to the data source, format, or type. Thus, the data may not be in a predetermined format.

The processing of the data may be done sequentially or in parallel, for example. In certain embodiments, some or all of the processing occurs at about the time. For example, some or all of the rules 450 may be used process the data at about the same time. In certain embodiments, some or all of the processing may begin starting from the beginning of the data. In certain embodiments, some of the processing may start from where prior processing stopped.

At step 640, data is prioritized. The data may be prioritized and/or organized by a prioritization component such as the prioritization component 430, described above, for example. The data to be prioritized may be the data that is received at step 610, for example. As another example, the data to be prioritized may be the data processed at step 630.

In certain embodiments, a priority may be determined for the data. For example, a priority for the data may be determined based at least in part on a decision value determined by the parsing component 420. The data may be stored in a queue and/or may be extracted from a queue based on the priority determined for the data and/or for the queue.

In certain embodiments, one or more queues may be used to store, organize, and/or prioritize the data. Alternatively, other data structures may be used for storing, organizing, and/or prioritizing the data. For example, a table, tree, or linked list may be used.

The data may be prioritized to provide QoS, for example. For example, a priority for data received over a tactical data network may be determined. In certain embodiments, the priority is based at least in part on content. In certain embodiments, the priority is based at least in part on a decision value determined by processing the data. The decision value may be determined by the processing at step 630, described above, for example. For example, the processing may indicate to the prioritization component 430 that the data is a video conference between generals and, thus, should be given a higher priority. As another example, the processing may indicate that the data is position telemetry data from a ground unit far away from the aircraft receiving the data and, thus, is lower priority. The priority may be used to determine which of a plurality of queues the data should be placed into for subsequent communication. For example, higher priority data may be placed in a queue intended to hold higher priority data, and in turn, in determining what data to next communicate, data may first be extracted from the higher priority queue.

The data may be prioritized based at least in part on one or more rules. As discussed above, the rules may be user defined and/or programmed based on system and/or operational constraints, for example. In certain embodiments, rules may be written in XML and/or provided via custom DLLs, for example.

In certain embodiments, the data to be prioritized is not dropped. That is, although data may be low priority, it is not dropped. Rather, the data may be delayed for a period of time, potentially dependent on the amount of higher priority data that is received.

In certain embodiments, the data communication system 410 includes a mode or profile indicator. The mode indicator may represent the current mode or state of the data communication system 410, for example. As discussed above, the data communications system 410 may use rules and modes or profiles to perform throughput management functions such as optimizing available bandwidth, setting information priority, and managing data links in the network. The different modes may affecting changes in rules, modes, and/or data transports, for example. For example, different modes may have different rules 450 associated with them. That is, one set of rules 450 may be utilized by the parser component 420, for example, in mode A, and a different, although potentially overlapping, set of rules 450 may be utilized in mode B. A mode or profile may include a set of rules related to the operational needs for a particular network state of health or condition. The data communication system 410 may provide dynamic reconfiguration of modes, including defining and switching to new modes "on-the-fly," for example. In certain embodiments, the rule selected at step 620 may be selected based at least in part on the mode or profile.

In certain embodiments, the prioritization of data is transparent to other applications. For example, the processing, organizing, and/or prioritization performed by certain embodiments is transparent to one or more source nodes 460 or other applications or data sources. For example, an application running on the same system as data communication system 410, or on a source node 460 connected to the data communication system 410, may be unaware of the prioritization of data performed by the data communication system 410.

At step 650, data is communicated. The data communicated may be the data received at step 610, for example. That data communicated may be the data processed at step 630, for example. The data communicated may be the data prioritized at step 640, for example. Data may be communicated from the data communication system 410, for example. The data may be communicated by the communication component 440, for example. The data may be communicated to one or more destination nodes 470, for example. The data may be communicated over one or more links, for example. For example, the data may be communicated by the communication component 440 over a tactical data network to a radio. As another example, data may be provided by the data communication system 410 to an application running on the same system by an inter-process communication mechanism.

One or more of the steps of the method 600 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Thus, certain embodiments of the present invention provide systems and methods for protocol filtering for QoS. Certain embodiments provide a technical effect of protocol filtering for QoS.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for prioritizing a block of data to provide content-based quality of service in a network, the method including:
   receiving a block of data;
   using at least one processing device to perform the steps of:
      selecting a selected rule from a set of available rules, wherein the selected rule includes an operation to be performed on the block of data and a key used in performing the operation on the block of data;
      processing the block of data according to the selected rule based at least in part on the operation to determine a decision value based at least in part on the key;
      prioritizing the block of data, wherein the block of data is prioritized based at least in part on the decision value.

2. The method of claim 1, wherein the block of data is received at least in part over a tactical data network.

3. The method of claim 1, wherein a format of the block of data is not predetermined.

4. The method of claim 1, wherein the processing step is transparent to the format of the block of data.

5. The method of claim 1, wherein the processing step occurs at the transport layer of a protocol stack.

6. The method of claim 1, wherein the prioritizing step includes inserting the block of data in a queue.

7. The method of claim 1, wherein at least one rule in the set of available rules is user defined.

8. The method of claim 1, wherein the at least one rule in the set of available rules is based at least in part on a mode.

9. The method of claim 1, wherein the operation includes at least one of an offset operation and a scan operation.

10. The method of claim 1, further including the step of communicating the block of data based at least in part on the prioritization of the block of data.

11. The method of claim 10, wherein the communicating step includes transmitting the block of data over a tactical data network.

12. The method of claim 10, wherein the communicating step includes passing the block of data to an application program.

13. A data communication system for providing content-based quality of service in a network, the system including:
   a rule, wherein the rule includes an operation to be performed on a block of data and a key used in performing the operation on the block of data, wherein the rule is included in a set of available rules; and
   at least one processing device comprising:
      a parser component, wherein the parser component is adapted to process data based at least in part on the operation and to match the key to determine a decision value; and
      a prioritization component, wherein the prioritization component is adapted to determine a priority for the data based at least in part on the decision value.

14. The system of claim 13, wherein the block of data is received over a tactical data network.

15. The system of claim 13, wherein the block of data is not in a predetermined format.

16. The system of claim 13, wherein the parser component operates as part of a transport layer of a protocol stack.

17. The system of claim 13, further including one or more queues, wherein the prioritization component is adapted to insert the block of data into the one or more queues based at least in part on the determined priority for the block of data.

18. The system of claim 13, including a mode indicator, wherein the mode indicator indicates a current mode, wherein the set of available rules is based at least in part on the current mode, and wherein the prioritization component is adapted to prioritize the block of data based at least in part on the current mode.

19. The system of claim 13, wherein the operation includes at least one of an offset operation and a scan operation.

20. A non-transitory computer-readable medium encoded with a set of instructions for execution on a computer, the set of instructions including:
   a selection routine, wherein the selection routine is configured to select a selected rule from a set of available rules after a block of data is received, wherein the selected rule includes an operation to be performed on the block of data and a key used in performing the operation on the block of data;
   a parsing routine, wherein the parsing routine is configured to process the block of data utilizing the selected rule based at least in part on the operation to determine a decision value based at least in part on the key;
   a prioritization routine, wherein the prioritization routine is configured to determine a priority for the data based at least in part on the decision value; and
   a communication routine, wherein the communication routine is configured to communicate the data based on the priority.

* * * * *